(12) United States Patent
Matsumoto et al.

(10) Patent No.: US 8,104,135 B2
(45) Date of Patent: Jan. 31, 2012

(54) WIPER APPARATUS

(75) Inventors: Hiroshi Matsumoto, Hamamatsu (JP); Masahiko Yamanishi, Kosai (JP)

(73) Assignee: Asmo Co., Ltd., Shizuoka-pref. (JP)

( * ) Notice: Subject to any disclaimer, the term of this patent is extended or adjusted under 35 U.S.C. 154(b) by 601 days.

(21) Appl. No.: 12/318,483

(22) Filed: Dec. 30, 2008

(65) Prior Publication Data

US 2010/0162512 A1 Jul. 1, 2010

(51) Int. Cl.
*B60S 1/34* (2006.01)
*B60S 1/06* (2006.01)
*B60S 1/24* (2006.01)

(52) U.S. Cl. ............... 15/250.31; 15/250.3; 15/250.19; 15/250.351; 15/250.352; 15/250.34

(58) Field of Classification Search .......... 15/250.351, 15/250.352, 250.21, 250.34, 250.31, 250.3, 15/250.19, 250.202, 250.203
See application file for complete search history.

(56) References Cited

U.S. PATENT DOCUMENTS

| | | | | |
|---|---|---|---|---|
| 3,108,307 A | * | 10/1963 | Redrow | 15/250.203 |
| 3,405,420 A | * | 10/1968 | Smithers et al. | 15/250.351 |
| 4,370,774 A | * | 2/1983 | Bienert et al. | 15/250.203 |
| 4,785,491 A | * | 11/1988 | Yamamoto et al. | 15/250.203 |
| 5,239,726 A | * | 8/1993 | Bianco | 15/250.4 |

FOREIGN PATENT DOCUMENTS

| | | | |
|---|---|---|---|
| EP | 0522338 | * | 1/1993 |
| EP | 1 125 806 A1 | | 8/2001 |
| JP | U-2-042859 | | 3/1990 |
| JP | U-H02-106958 | | 8/1990 |
| JP | 5-229404 | * | 9/1993 |

OTHER PUBLICATIONS

Office Action dated on Apr. 12, 2011 issued in the corresponding Japanese Patent Application No. 2007-115626 (English translation enclosed).

* cited by examiner

*Primary Examiner* — Gary Graham
(74) *Attorney, Agent, or Firm* — Posz Law Group, PLC

(57) ABSTRACT

A swing lever is fixed to a pivot shaft to pivot the pivot shaft about a pivot axis thereof. A wiper arm is directly connected to a distal end portion of the pivot shaft and is pivoted together with the pivot shaft about the pivot axis of the pivot shaft when the pivot shaft is driven by the swing lever. The wiper arm is pivotable about a pivot axis thereof, which is generally perpendicular to or is tilted relative to the pivot axis of the pivot shaft, toward or away from a wiping surface. A coil spring is directly or indirectly connected between the wiper arm and the swing lever to exert an urging force to urge the wiper arm toward the wiping surface in a wiping operational position of the wiper arm for wiping the wiping surface.

18 Claims, 13 Drawing Sheets

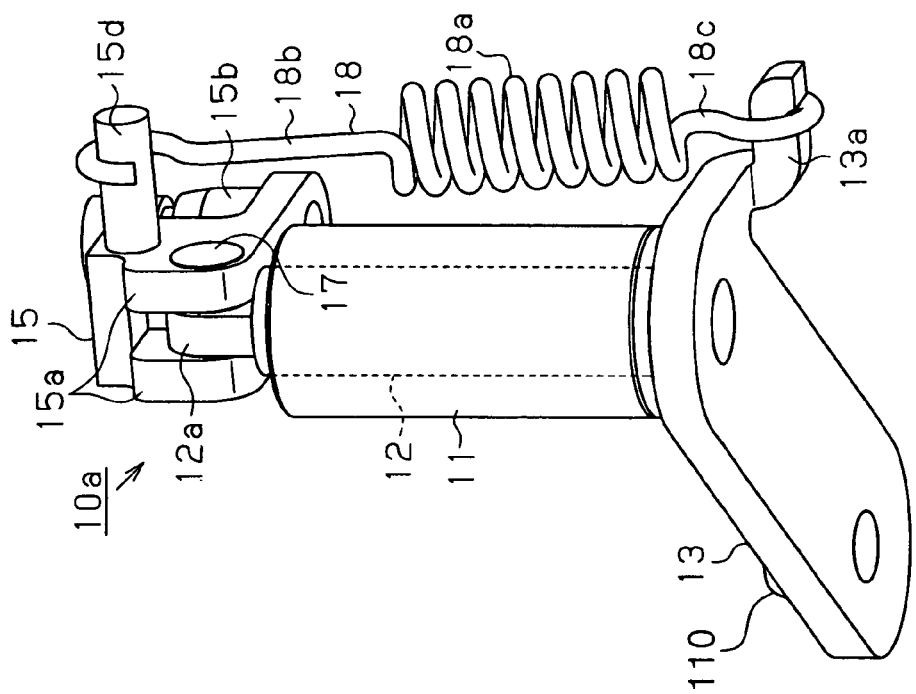
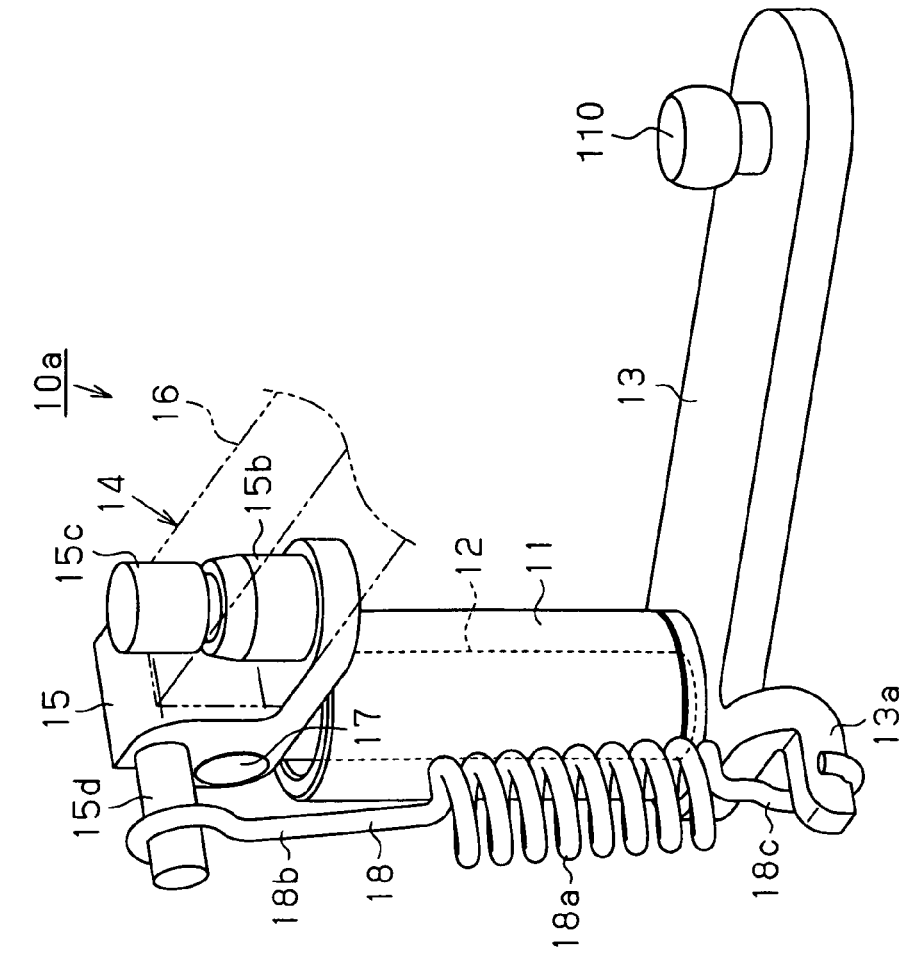

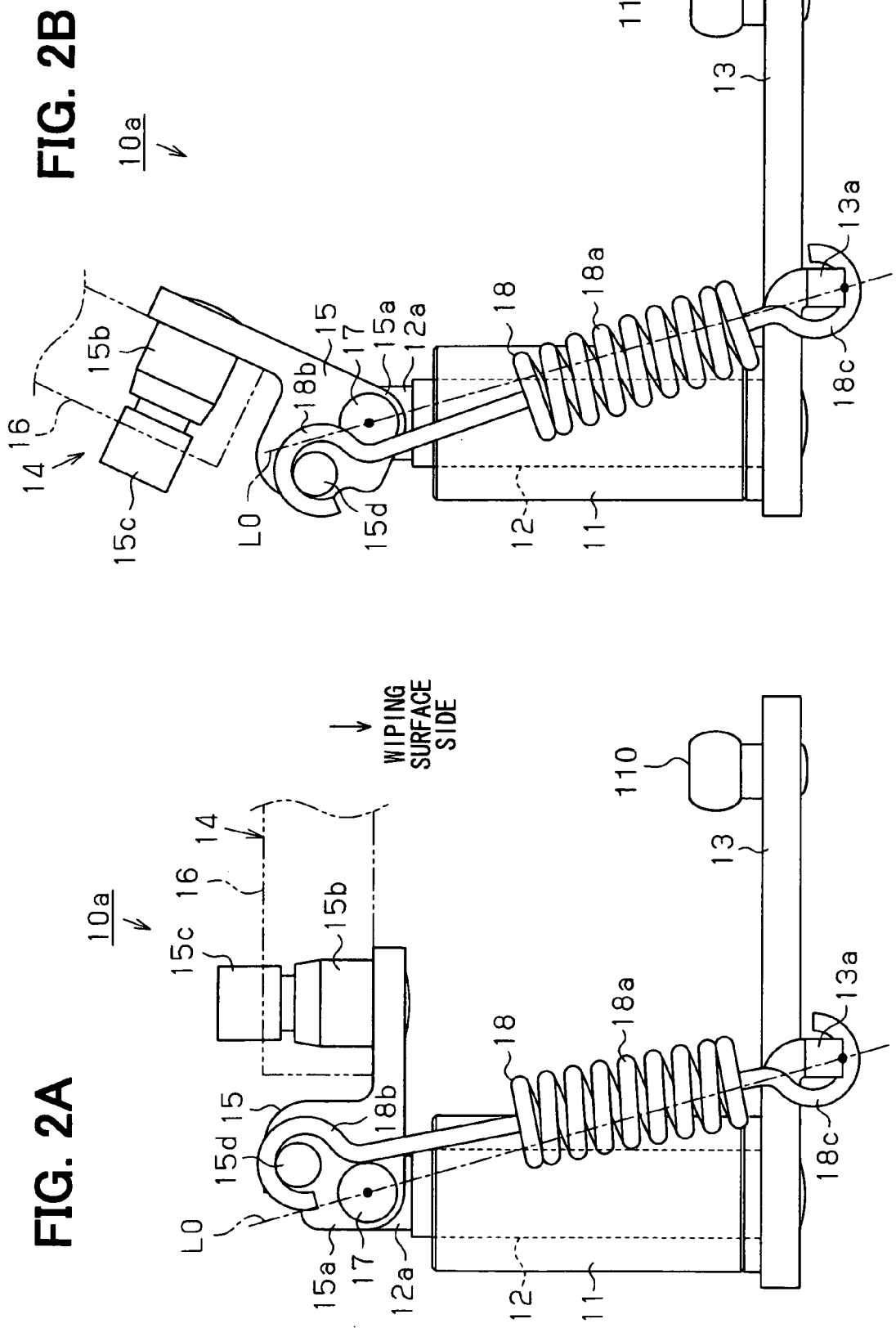

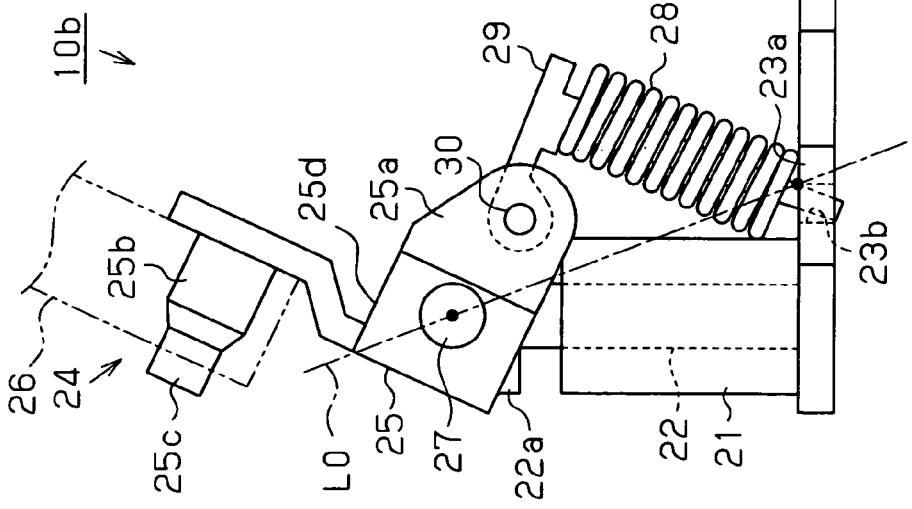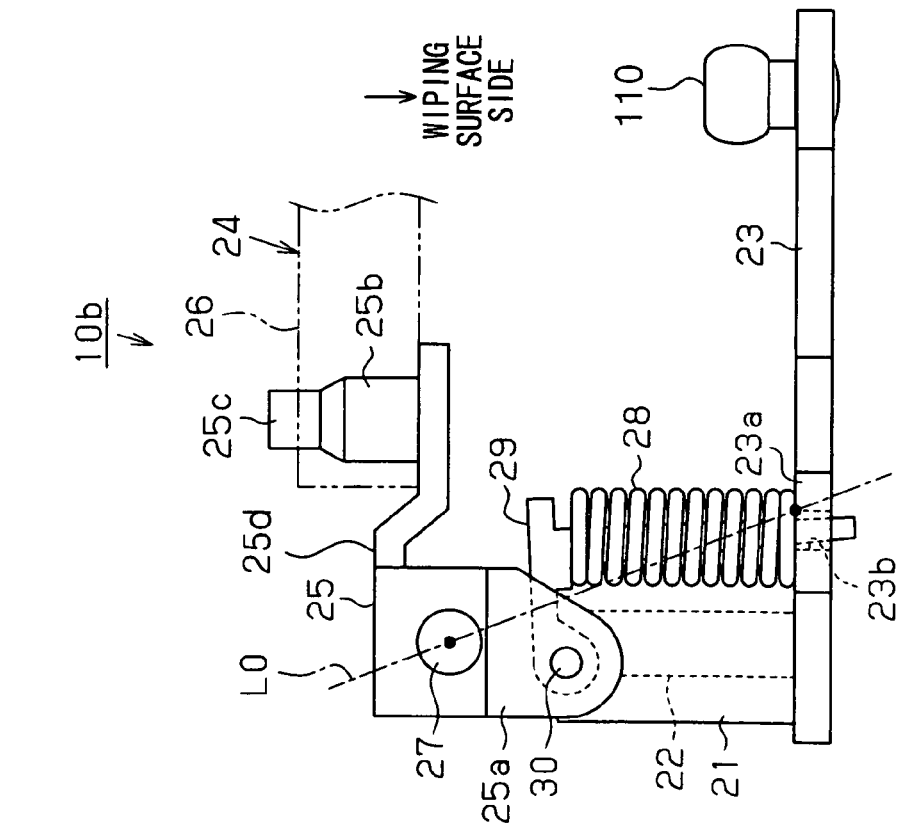

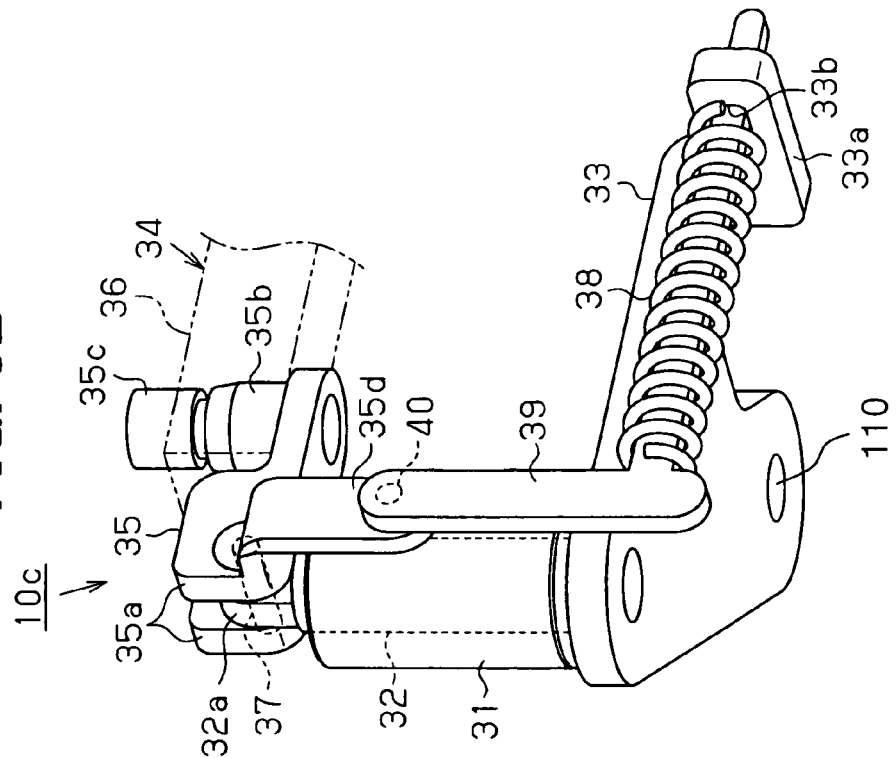
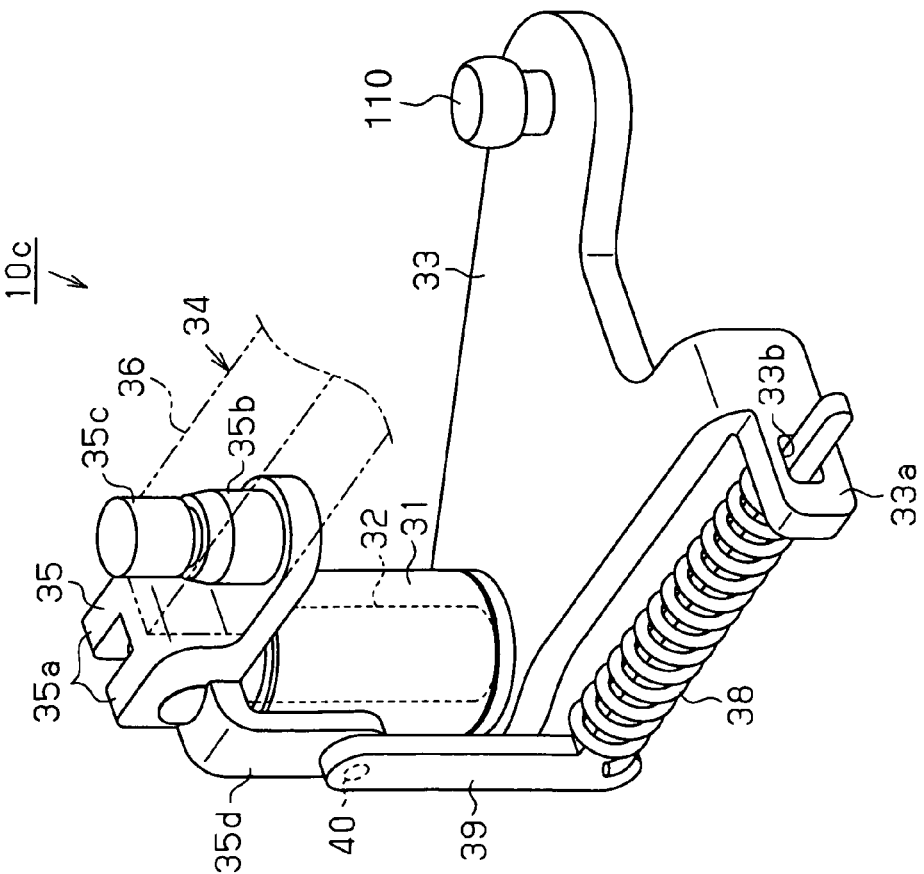

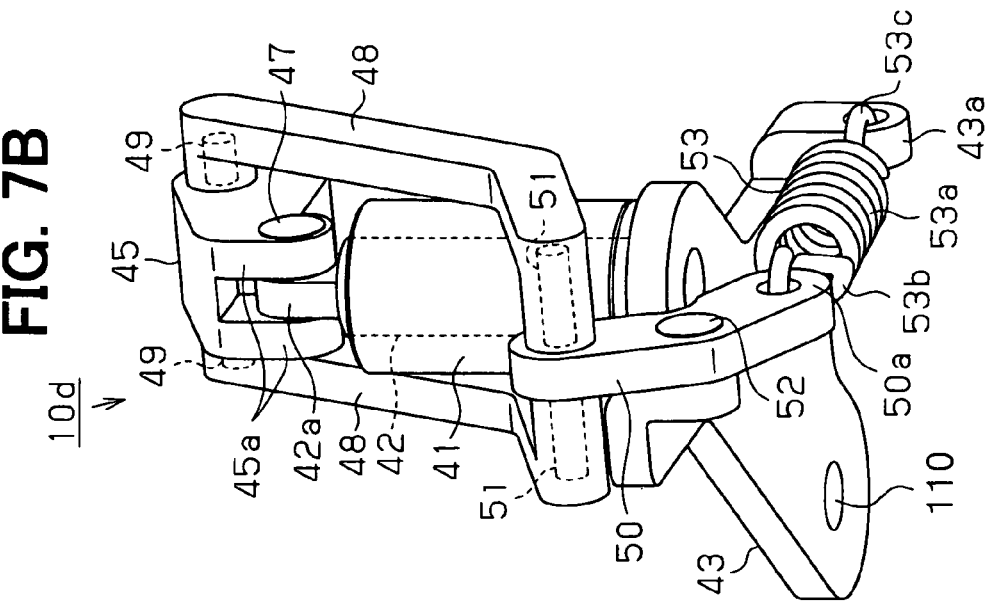
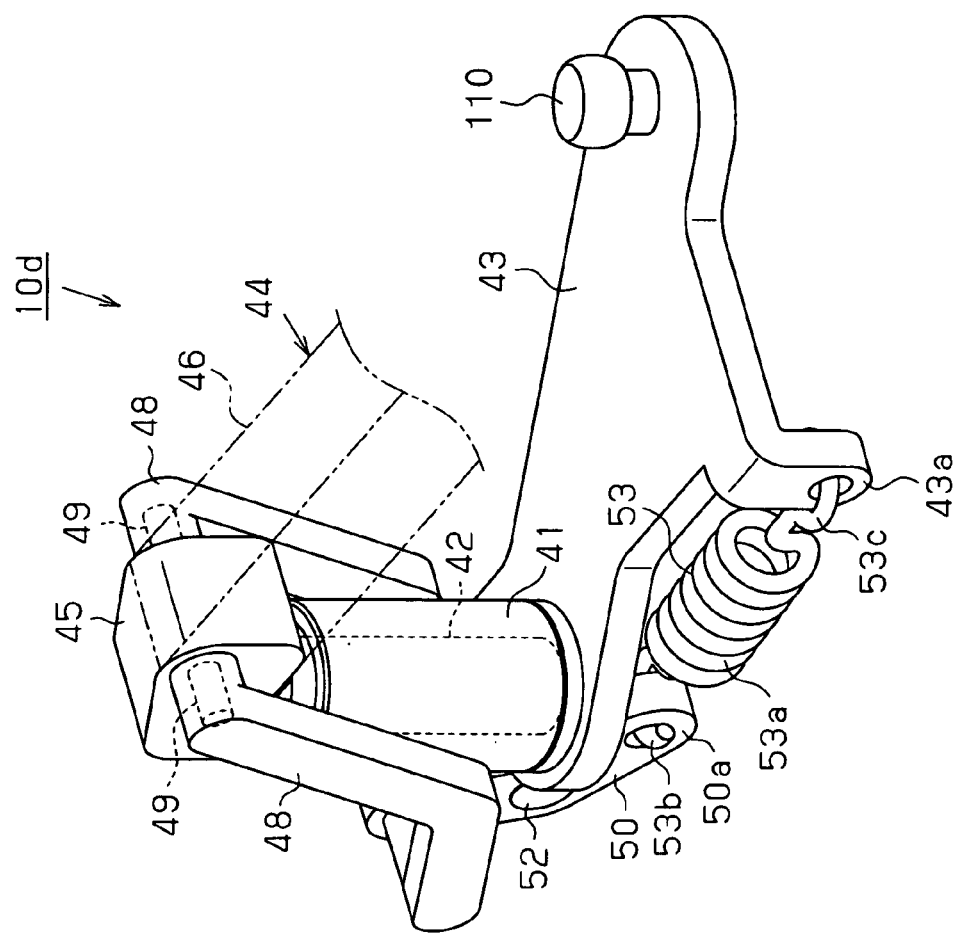
FIG. 7A
FIG. 7B

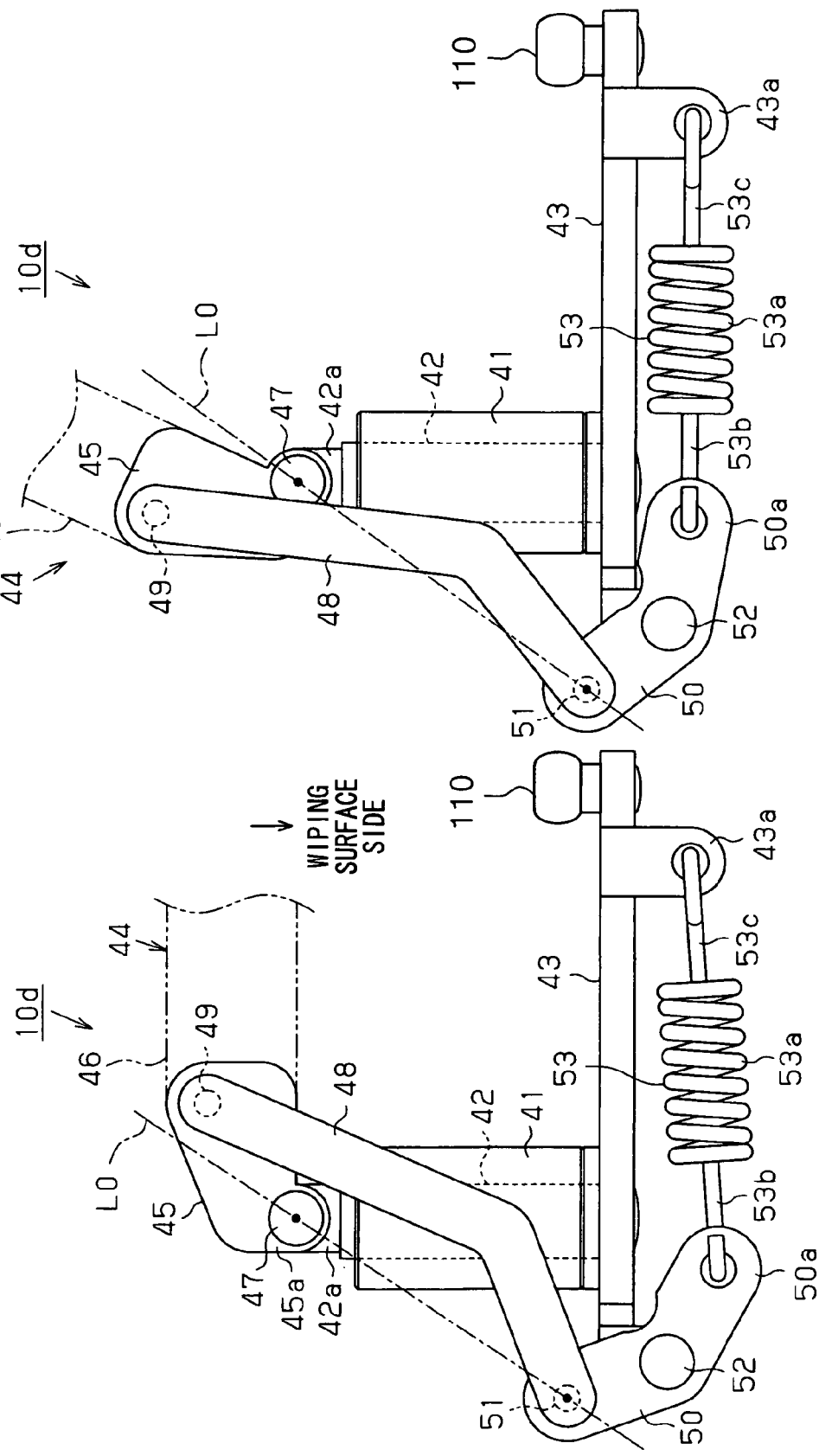

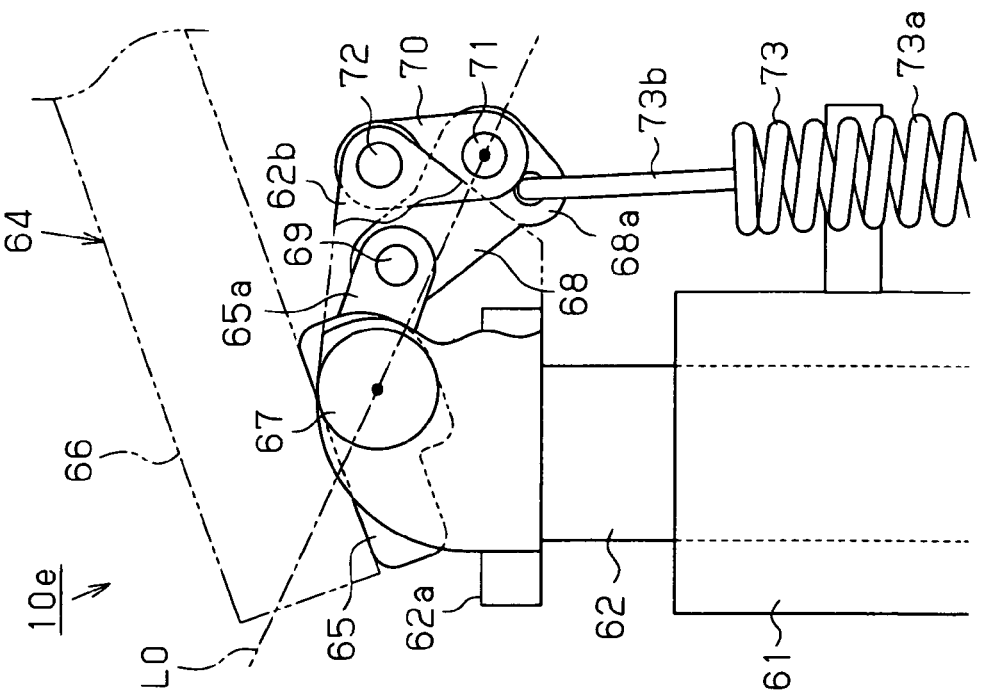
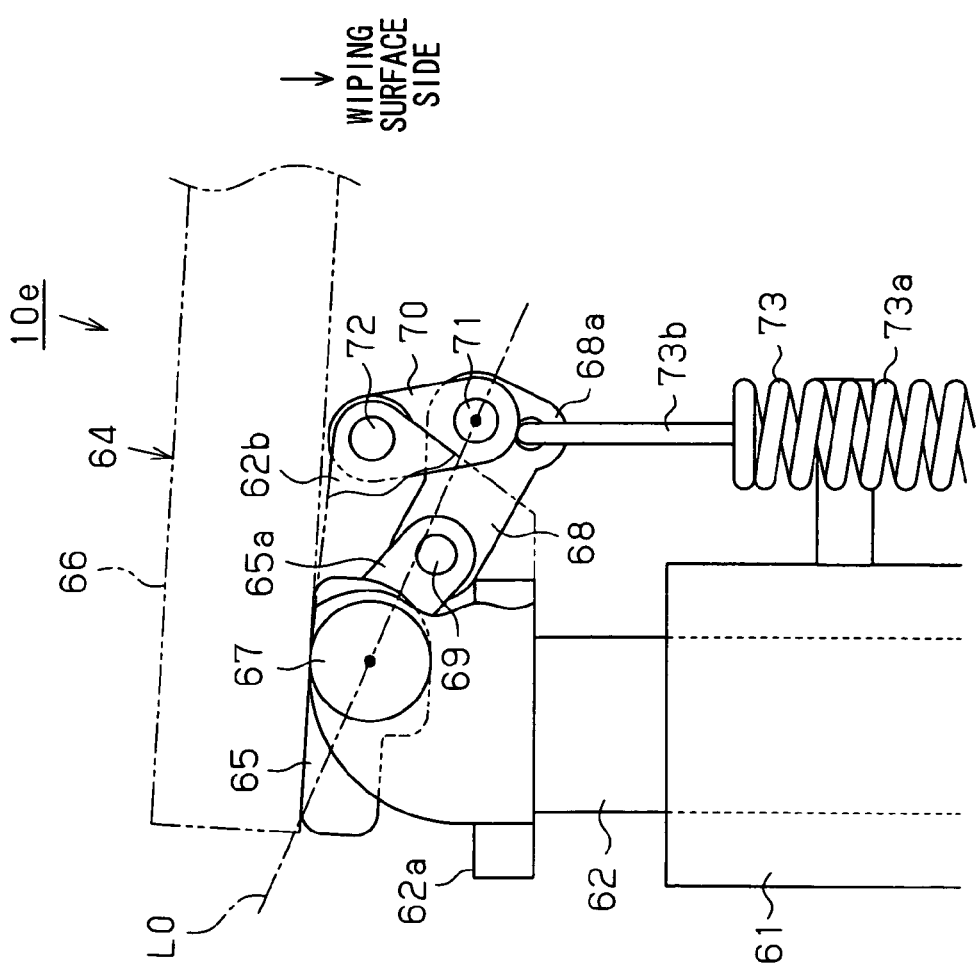

WIPER APPARATUS

CROSS REFERENCE TO RELATED APPLICATION

This application is based on and incorporates herein by reference Japanese Patent Application No. 2007-115626 filed on Apr. 25, 2007.

BACKGROUND OF THE INVENTION

1. Field of the Invention

The present invention relates to a wiper apparatus.

2. Description of Related Art

A wiper arm of a wiper of a vehicle includes an urging member that urges a distal end portion of the wiper arm toward a window glass (a wiping surface) to urge a wiper blade, which wipes the window glass, toward the window glass. Specifically, the wiper arm includes an arm head and an arm member (a retainer). The arm head is fixed to a pivot shaft, which is pivoted by a drive force of a wiper motor. A base end portion of the arm member is pivotably connected to the arm head and has an inverted U-shaped cross section, which opens toward the wiping surface. A coil spring is received in the inverted U-shaped part of the arm member. The coil spring is engaged between the arm member and the arm head to urge the distal end portion of the arm member toward the wiping surface through use of, for example, a tensile force of the coil spring.

Lately, it has been demanded to further reduce the profile (a size in the height direction) of the wiper arm (wiper), for example, to improve the appearance thereof, to reduce the influences of the head wind applied thereto, and to provide an improved visibility to a driver of the vehicle. For instance, European Patent Application Publication No. EP1125806A1 discloses a wiper apparatus, in which an ordinary cylindrical spring main body of a coil spring is compressed into a generally planar form, and this coil spring is installed into an inverted U-shaped part of an arm member in such a manner that a direction perpendicular to the plane of the planar spring main body coincides with a height direction of the wiper arm. In this way, the profile of the wiper arm is advantageously reduced. Furthermore, in Japanese Unexamined Utility Model Publication No. H02-106958A, the coil spring is changed to a leaf spring to reduce the profile of the wiper arm.

However, in both of the above publications, the inverted U-shaped part of the arm member, which receives the planar coil spring or the leaf spring, needs to have the size (the thickness), which is sufficient to receive such an urging member. Therefore, the degree of freedom with respect the design of the arm member is significantly limited. Thus, it is difficult to implement the wiper arm having a good appearance suitable for modern vehicles having the high design quality. Also, it is difficult to implement the wiper arm suitable for achieving the high performance in terms of the aerodynamics to effectively urge the wiper against the wiping surface through use of the head wind.

SUMMARY OF THE INVENTION

The present invention addresses the above disadvantages.

According to the present invention, there is provided a wiper apparatus for wiping a wiping surface of a vehicle. The wiper apparatus includes a pivot holder, a pivot shaft, a swing member, a wiper arm and at least one urging member. The pivot holder is adapted to be installed to a body of the vehicle. The pivot shaft is supported by the pivot holder and is pivotable about a pivot axis thereof. The swing member is fixed to the pivot shaft to drive the pivot shaft about the pivot axis. The wiper arm is directly connected to a distal end portion of the pivot shaft and is pivoted together with the pivot shaft about the pivot axis of the pivot shaft when the pivot shaft is driven by the swing member. The wiper arm is pivotable about a pivot axis thereof, which is angled relative to the pivot axis of the pivot shaft, toward or away from the wiping surface. At least one urging member is directly or indirectly connected between the wiper arm and the swing member to exert an urging force to urge the wiper arm toward the wiping surface in a wiping operational position of the wiper arm for wiping the wiping surface.

BRIEF DESCRIPTION OF THE DRAWINGS

The invention, together with additional objectives, features and advantages thereof, will be best understood from the following description, the appended claims and the accompanying drawings in which:

FIG. 1A is a top perspective view of a wiper apparatus according to a first embodiment of the present invention;

FIG. 1B is a bottom perspective view of the wiper apparatus of FIG. 1A;

FIG. 2A is a side view showing the wiper apparatus of the first embodiment in a set position;

FIG. 2B is a side view showing the wiper apparatus of the first embodiment in a rock-back position;

FIG. 4A is a side view showing the wiper apparatus of the second embodiment in a set position;

FIG. 4B is a side view showing the wiper apparatus of the second embodiment in a rock-back position;

FIG. 5A is a top perspective view of a wiper apparatus according to a third embodiment of the present invention;

FIG. 5B is a bottom perspective view of the wiper apparatus of FIG. 5A;

FIG. 7A is a top perspective view of a wiper apparatus according to a fourth embodiment of the present invention;

FIG. 7B is a bottom perspective view of the wiper apparatus of FIG. 7A;

FIG. 8A is a side view showing the wiper apparatus of the fourth embodiment in a set position;

FIG. 8B is a side view showing the wiper apparatus of the fourth embodiment in a rock-back position;

FIG. 10A is a side view showing the wiper apparatus of the fifth embodiment in a set position;

FIG. 10B is a side view showing the wiper apparatus of the fifth embodiment in a rock-back position;

DETAILED DESCRIPTION OF THE INVENTION

First Embodiment

Figure 3B:
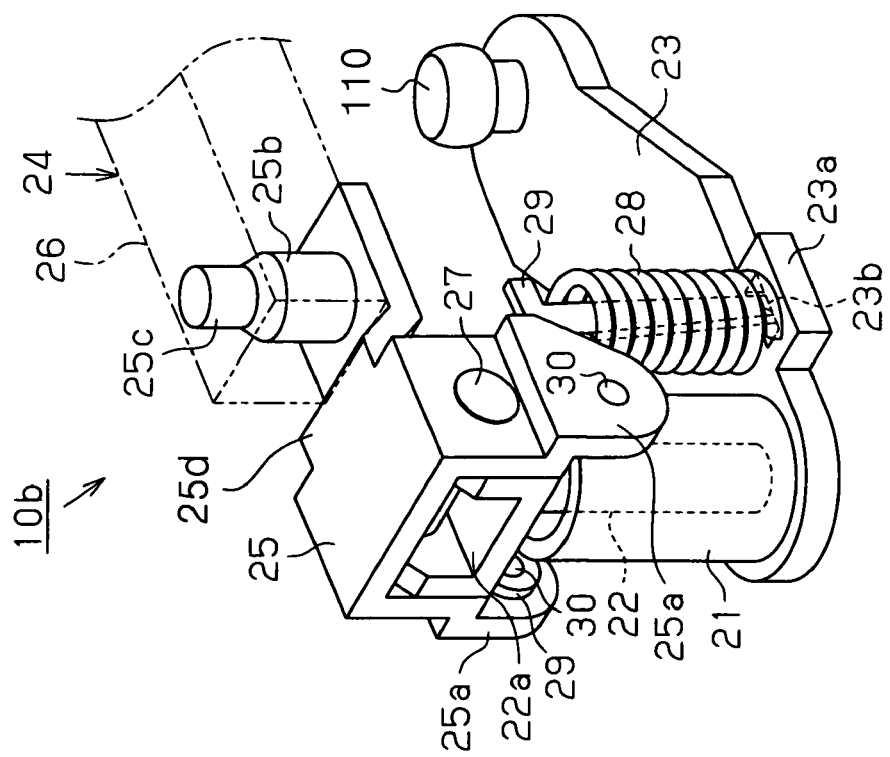
FIG. 3B is a rear side top perspective view of the wiper apparatus of FIG. 3A.

A first embodiment of the present invention will be described with reference to the accompanying drawings. In the following description, similar components will be indicated by the same reference numerals throughout the following embodiments of the present invention.

Figure 13:
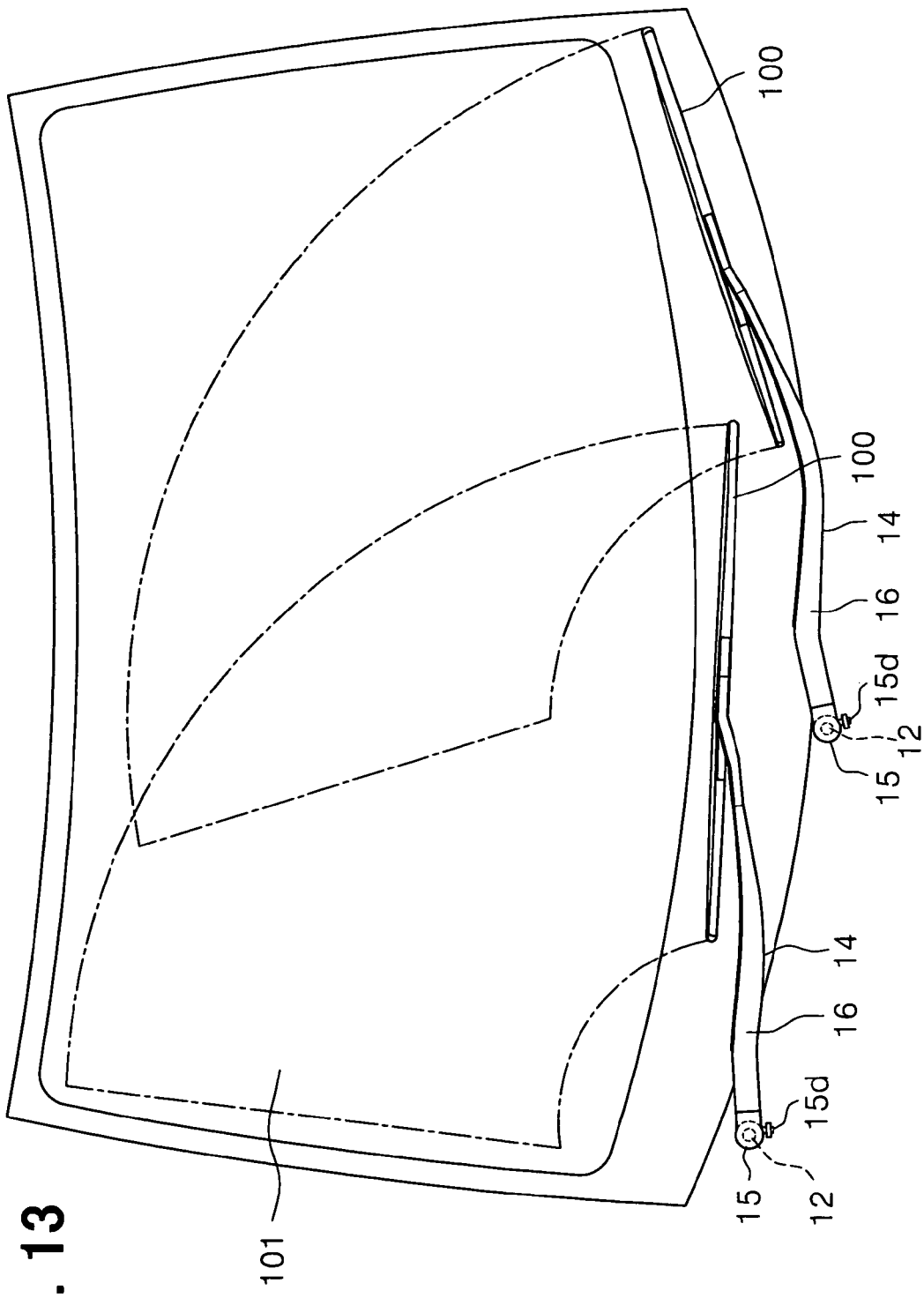
FIG. 13 is a schematic view showing a portion of a front window glass of a vehicle along with the wiper apparatus according to the first embodiment.

FIGS. 1A and 1B show a wiper apparatus 10a according to the present embodiment. As shown in FIG. 13, the wiper apparatus 10a is provided to wipe a window glass (wiping surface) 101 of a vehicle.

A cylindrical pivot holder 11 is installed to a body of the vehicle. A pivot shaft 12 is received through the pivot holder 11 in such a manner that the pivot shaft 12 is pivotable about a pivot axis thereof. A base end portion (a lower end portion in FIGS. 1A and 1B) of the pivot shaft 12 is fixed to a base end portion of a generally planar swing lever (serving as a swing member) 13. A plane of the swing lever 13 extends in a direction, which is generally perpendicular to the pivot axis of the pivot shaft 12. A distal end portion of the swing lever 13 is connected to a link of a link mechanism (not shown) through a ball pin 110. When the link mechanism is driven by a wiper motor (not shown), the swing lever 13 is reciprocally pivoted within a predetermined angular range to drive the pivot shaft 12. Thus, the pivot shaft 12 is reciprocally pivoted within a predetermined angular range.

A wiper arm 14 is installed to a distal end portion (an upper end portion) of the pivot shaft 12. The wiper arm 14 includes a base member 15 and an elongated arm member 16. The base member 15 is located at a base end portion of the wiper arm 14, and the arm member 16 is fixed to the base member 15. A base end portion of the base member 15 has two connecting elements 15a, between which a connecting element 12a located at the distal end portion of the pivot shaft 12 is held. In a state where the connecting element 12a is held between the connecting elements 15a, a connecting pin 17 is installed through receiving holes of the connecting elements 15a and of the connecting element 12a in a direction generally perpendicular to the pivot axis of the pivot shaft 12. In this way, the base member 15 is pivotably connected to the distal end portion of the pivot shaft 12 through the connecting pin 17. A center axis of the connecting pin 17 forms a pivot axis of the wiper arm 14 described below, which extends generally perpendicular to the pivot axis of the pivot shaft 12.

A fixation shaft 15b projects upward from a distal end portion of the base member 15. The arm member 16 is fixed to the fixation shaft 15b. The fixation shaft 15b is configured into a generally cylindrical shape and has a male thread 15c at a distal end portion of the fixation shaft 15b. A wiper blade 100, which is placed on the wiping surface 101, is installed to a distal end portion of the arm member 16 (see FIG. 13). In a set position (a wiping operational position) of the wiper arm 14 shown in FIG. 2A, at which the wiper blade 100 contacts the wiping surface 101, the fixation shaft 15b extends generally parallel to the pivot shaft 12. A receiving hole of the base end portion of the arm member 16, which extends in a top-to-bottom direction in FIG. 2A, receives the fixation shaft 15b therethrough, and a nut (not shown) is tightly screwed over the male thread 15c at the distal end portion of the fixation shaft 15b upon adjustment of a position (circumferential position) of the arm member 16 about the fixation shaft 15b. Thereby, the arm member 16 is fixed at a desired position about the fixation shaft 15b, and the arm member 16 is detachably fixed to the base member 15 through the fixation shaft 15b.

An engaging portion 15d is provided at one lateral side of the base member 15 to extend generally parallel to the axis of the connecting pin 17. An engaging portion 13a, which is partially bent, is provided at the swing lever 13 to correspond with the engaging portion 15d of the base member 15. A coil spring (tension coil spring) 18 is hooked between the engaging portion 13a and the engaging portion 15d. The coil spring 18 includes a spirally coiled spring main body 18a and two hooks 18b, 18c. The hooks 18b, 18c are provided at opposed ends, respectively, of the spring main body 18a. The hook 18b is hooked to the engaging portion 15d of the base member 15, and the hook 18c is hooked to the engaging portion 13a of the swing lever 13. The coil spring 18 is placed on one lateral side of the pivot holder 11 (the pivot shaft 12) to extend generally in the axial direction of the pivot holder 11 (the pivot shaft 12). The coil spring 18 exerts a tensile force between the engaging portion 13a and the engaging portion 15d.

In this case, in the set position of the wiper arm 14 shown in FIG. 2A, the engaging portion 15d of the base member 15 is located on a distal side (side where the distal end of the wiper arm 14 is located) of an imaginary line L0, which connects between the pivot axis (the axis of the connecting pin 17) of the base member 15 and the engaging point (the point of application of the tensile force) of the engaging portion 13a of the swing lever 13. Thus, at the set position of the wiper arm 14, due to the tensile force of the coil spring 18, which is exerted between the engaging portion 13a and the engaging portion 15d, the distal end portion of the base member 15 is urged downward about the connecting pin 17. This urging force urges the distal end portion of the wiper arm 14 toward the wiping surface 101 to urge the wiper blade 100, which is installed to the distal end portion of the wiper arm 14, toward the wiping surface 101.

At the state shown in FIG. 2A, when the distal end portion of the wiper arm 14 is pivoted backward away from the wiping surface 101, the engaging portion 15d of the base member 15 passes the imaginary line L0, which connects between the pivot axis (the axis of the connecting pin 17) of the base member 15 and the engaging point of the engaging portion 13a of the swing lever 13, as shown in FIG. 2B. Thus, the tensile force, which is exerted between the engaging portion 13a and the engaging portion 15d, is shifted to act as an urging force, which urges the wiper arm 14 in a lifting direction thereof (a direction away from the wiping surface 101). Thereby, the wiper arm 14 is held in a predetermined lifted position (rock-back position).

In the case of the wiper apparatus 10a of the present embodiment, at the time of the wiping operation, the swing lever 13 is reciprocally pivoted within the predetermined angular range through the action of the link mechanism, and thereby the wiper arm 14 is reciprocally pivoted about the pivot axis of the pivot shaft 12 within the predetermined angular range through the pivot shaft 12. At this time, the swing lever 13 and the base member 15 of the wiper arm 14 are pivoted together about the pivot axis of the pivot shaft 12. Thus, the coil spring 18 is reciprocally driven in the circumferential direction around the outer peripheral surface of the pivot holder 11 without causing substantial torsion of the coil spring 18. That is, the coil spring 18 is placed at the outside of the wiper arm 14 (specifically, the arm member 16). The coil spring 18 is moved integrally with the wiper arm 14, the swing lever 13 and the pivot shaft 12 and urges the wiper arm 14 toward the wiping surface 101. As described above, when the coil spring 18 is placed between the wiper arm 14 (the base member 15) and the swing lever 13, it is no longer required to consider the installation of the urging member (coil spring) in the arm member 16. Thereby, the shape of the arm member 16 can be more freely designed.

Next, advantages of the present embodiment will be described.

(1) In the present embodiment, the base end portion of the wiper arm 14 is connected to the distal end portion of the pivot shaft 12 in the pivotable manner, so that the distal end portion of the wiper arm 14 is pivotable toward or away from the wiping surface 101. Furthermore, the swing lever 13 is fixed to the base end portion of the pivot shaft 12. The coil spring 18, which is the urging member, is hooked between, i.e., is engaged (directly connected) between the base member 15 of the wiper arm 14 and the swing lever 13 to exert the urging force therebetween. That is, the wiper arm 14, the swing lever 13 and the pivot shaft 12 are integrally moved while urging the wiper arm 14 toward the wiping surface 101 in the state where the coil spring 18 is placed at the outside of the wiper arm 14. In this way, it is no longer required to consider the reception of the urging member (the coil spring 18) in the wiper arm 14. Thereby, the shape of the wiper arm 14 (the arm member 16 in this instance) can be more freely designed.

(2) The wiper arm 14 of the present embodiment includes the base member 15, which is connected to the pivot shaft 12 and is engaged with the one side (the hook 18b) of the coil spring 18, and the elongated arm member 16, which is installed to the base member 15. That is, the connection of the wiper arm 14 to the pivot shaft 12 and the engagement of the wiper arm 14 to the coil spring 18 are carried out only at the base member 15, so that it is only required to consider the design of the base member 15. Therefore, it is not required to consider the design of the arm member 16 with respect to these points, and thereby the higher degree of freedom can be achieved with respect to the shape of the arm member 16.

(3) The arm member 16 of the present embodiment is detachably installed to the base member 15. Thus, for example, replacement of the arm member 16 can be carried out at the low costs. In other words, since the replacement of the arm member 16 is possible, the wiper pivot (the pivot shaft 12, the swing lever 13 and the coil spring 18) and the base member 15 can be standardized or can be universally used (i.e., can be commonly used among various types of wiper apparatuses).

(4) The base member 15 of the present embodiment includes the fixation shaft 15b, which is generally parallel to the pivot shaft 12, and the arm member 16 is installed to the fixation shaft 15b in such a manner that the position of the arm member 16 is adjustable about the fixation shaft 15b. In this way, the arm member 16 can be easily and reliably installed to the desired position.

(5) In the present embodiment, when the wiper arm 14 is pivoted about the pivot axis (the axis of the connecting pin 17) relative to the pivot shaft 12; the urging force of the coil spring 18 is changed between the urging force, which urges the wiper arm 14 toward the wiping surface 101, and the urging force, which urges the wiper arm 14 away from the wiping surface 101. That is, the urging of the wiper arm 14 toward the wiping surface 101 (toward the wiping operational position) and the urging of the wiper arm 14 away from the wiping surface 101 (toward the lifted position) are carried out with the single type of coil spring 18. Therefore, it is possible to simplify the structure for implementing the rocking back and forth of the wiper arm 14 to selectively place and hold the wiper arm 14 in one of the wiping operational position and the lifted position.

Second Embodiment

A second embodiment of the present invention will be described with reference to the accompanying drawings. In the present embodiment, the use of each urging member, which urges the distal end portion of the wiper arm toward the wiping surface and is placed between the wiper arm and the swing lever, is the same as that of the first embodiment. However, unlike the first embodiment, two compression coil springs are used as urging members in the present embodiment.

Figure 3A:
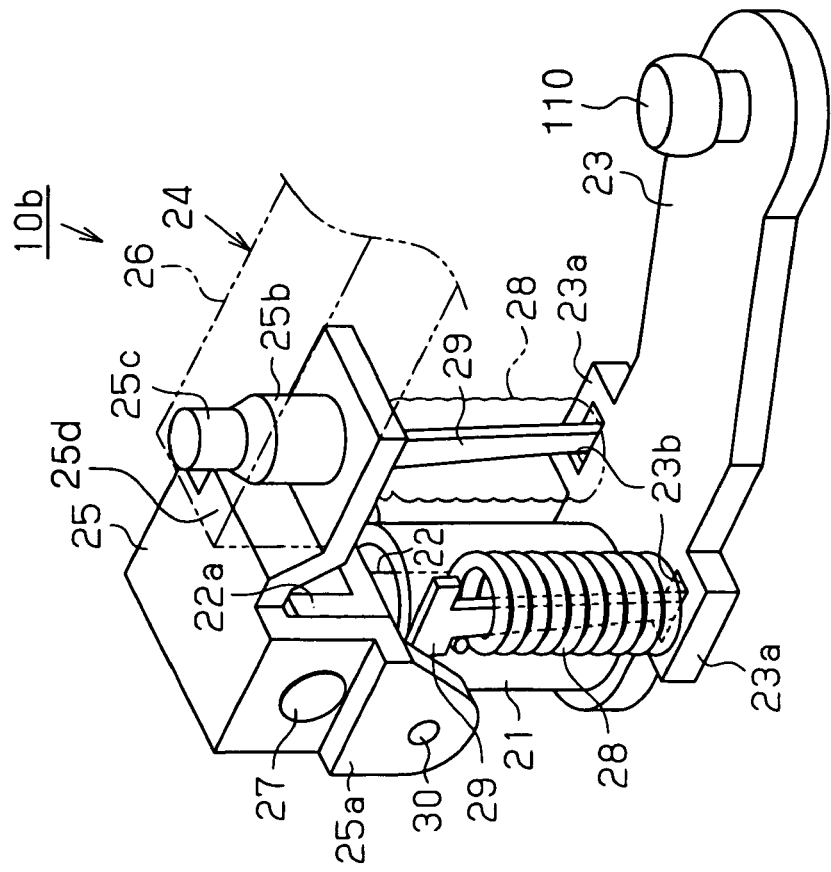
FIG. 3A is a front side top perspective view of a wiper apparatus according to a second embodiment of the present invention.

Specifically, in a wiper apparatus 10b of the present embodiment shown in FIGS. 3A and 3B, a pivot shaft 22 is received through a cylindrical pivot holder 21 installed to the body of the vehicle and is supported in the pivotable manner about the pivot axis thereof. A base end portion (a lower end portion) of the pivot shaft 22 is fixed to a base end portion of a generally planar swing lever 23. The plane of the swing lever 23 extends in a direction, which is generally perpendicular to the pivot axis of the pivot shaft 22. The link mechanism, which is driven by the wiper motor, is connected to a distal end portion of the swing lever 23 through the ball pin 110.

A wiper arm 24 is installed to the distal end portion (the upper end portion) of the pivot shaft 22. The wiper arm 24 includes a base member 25 and an elongated arm member 26. The base member 25 is located at a base end portion of the wiper arm 24, and the arm member 26 is fixed to the base member 25. The base member 25 has a first base portion (also referred to as a connecting portion) 22a and a second base portion 25d. A base end portion of the second base portion 25d has two connecting elements 25a, between which the first base portion 22a is held. The first base portion 22a is formed separately from the pivot shaft 22 and is fixed to the distal end portion of the pivot shaft 22 by, for example, a nut screwed to a male thread of the distal end portion of the pivot shaft 22. Alternatively, the first base portion 22a may be formed integrally with the pivot shaft 22, if desired. In a state where the first base portion 22a is held between the connecting elements 25a, a connecting pin 27 is installed through receiving holes of the connecting elements 25a and of the first base portion 22a in a direction generally perpendicular to the pivot axis of the pivot shaft 22. In the second base portion 25d of the base member 25, the pivot axis of the connecting pin 27 extends in a direction generally perpendicular to the pivot axis of the pivot shaft 22. The second base portion 25d of the base member 25 is connected to the first base portion 22a at the distal end portion of the pivot shaft 22 through the connecting pin 27 in such a manner that the second base portion 25d is pivotable about the pivot axis (the axis of the connecting pin 27) relative to the pivot shaft 22.

A fixation shaft 25b projects upward from a distal end portion of the second base portion 25d of the base member 25. A distal end portion of the fixation shaft 25b has a male thread 25c, to which a base end portion of the arm member 26 is fixed. A receiving hole of the base end portion of the arm member 26 receives the fixation shaft 25b therethrough, and a nut (not shown) is tightly screwed over the male thread 25c at the distal end portion of the fixation shaft 25b upon adjustment of a position of the arm member 26 about the fixation shaft 25b. The arm member 26 is detachably fixed to the second base portion 25d of the base member 25.

Two guide members 29, each of which receives and supports a coil spring (compression coil spring) 28, are installed to the connecting elements 25a, respectively, of the second base portion 25d of the base member 25 by respective connecting pins 30. Each connecting pin 30 extends in a direction generally parallel to the connecting pin 27. Each guide member 29 is configured into an inverted L-shape. A shorter arm of the inverted L-shaped guide member 29 is pivotably connected to the corresponding connecting element 25a through the connecting pin 30. A longer arm of the inverted L-shaped guide member 29 receives the corresponding coil spring 28, and a distal end portion of the longer arm of the inverted L-shaped guide member 29 is inserted through an engaging hole 23b of a corresponding engaging portion 23a of the swing lever 23. The coil springs (serving as first and second side urging members) 28 are placed on the opposed lateral sides, respectively, of the pivot holder 21 (the pivot shaft 22 and the wiper arm 24) in such a manner that the coil springs 28 extend generally parallel to the pivot axis of the pivot shaft 22. Each coil spring 28 exerts an expansion force between the engaging portion 23a and the connecting pin 30 through the guide member 29. Here, the guide member 29 on the one lateral side of the pivot holder 21 and of the wiper arm 24 serves as a first side conducting member, and the other guide member 29 on the other lateral side of the pivot holder 21 and of the wiper arm 24 serves as a second side conducting member.

In this case, in the set position of the wiper arm 24 shown in FIG. 4A, the connecting pin 30, which is installed to the base member 25, is located on a base side (side opposite from the distal side where the distal end of the wiper arm 24 is located) of an imaginary line L0, which connects between the pivot axis (the axis of the connecting pin 27) of the base member 25 and the engaging point of the engaging portion 23a of the swing lever 23. Thus, at the set position of the wiper arm 24, due to the expansion force of each coil spring 28, which is exerted between the engaging portion 23a and the connecting pin 30, the distal end portion of the second base portion 25d of the base member 25 is urged downward about the connecting pin 27. This urging force urges the distal end portion of the wiper arm 24 toward the wiping surface 101 to urge the wiper blade 100, which is installed to the distal end portion of the wiper arm 24, toward the wiping surface 101.

At the position shown in FIG. 4A, when the distal end portion of the wiper arm 24 is pivoted backward away from the wiping surface 101, the connecting pin 30 installed to the base member 15 passes the imaginary line L0, which connects between the pivot axis (the axis of the connecting pin 27) of the base member 25 and the engaging portion 23a of the swing lever 23, as shown in FIG. 4B. Thus, the expansion force, which is exerted between the engaging portion 23a and the connecting pin 30, is shifted to act as an urging force, which urges the wiper arm 24 in a lifting direction thereof (a direction away from the wiping surface 101). Thereby, the wiper arm 24 is held in a predetermined lifted position (rockback position).

In the case of the wiper apparatus 10b of the present embodiment, at the time of the wiping operation, the swing lever 23 is reciprocally pivoted within the predetermined angular range through the action of the link mechanism, and thereby the wiper arm 24 is reciprocally pivoted within the predetermined angular range through the pivot shaft 22. At this time, the swing lever 23 and the base member 25 of the wiper arm 24 are pivoted together about the pivot shaft 22. Thus, the coil springs 28 and the guide members 29 are reciprocally driven in the circumferential direction around the outer peripheral surface of the pivot holder 21 without causing substantial torsion of the coil springs 28 and the guide members 29. That is, each coil spring 28 and the associated guide member 29 are placed at the outside of the wiper arm 24 (specifically, the arm member 26). The coil spring 28 and the associated guide member 29 are moved integrally with the wiper arm 24, the swing lever 23 and the pivot shaft 22 and urge the wiper arm 24 toward the wiping surface 101. As described above, when the coil spring 28 is placed between the wiper arm 24 (the base member 25) and the swing lever 23, it is no longer required to consider the installation of the urging member in the arm member 26. Thereby, the shape of the arm member 26 can be more freely designed.

Next, advantages of the present embodiment will be described.

(1) In the present embodiment, the base end portion of the wiper arm 24 is connected to the distal end portion of the pivot shaft 22 in the pivotable manner, so that the distal end portion of the wiper arm 24 is pivotable toward or away from the wiping surface 101. Furthermore, the swing lever 23 is fixed to the base end portion of the pivot shaft 22. Each coil spring 28, which is the urging member, is hooked between, i.e., is engaged (indirectly connected) between the base member 25 of the wiper arm 24 and the swing lever 23 through the guide member 29 to exert the urging force therebetween. That is, the wiper arm 24, the swing lever 23 and the pivot shaft 22 are integrally moved while urging the wiper arm 24 toward the wiping surface 101 in the state where each coil spring 28 and its associated guide member 29 are placed at the outside of the wiper arm 24. In this way, it is no longer required to consider the reception of the urging member (the coil spring 28) in the wiper arm 24. Thereby, the shape of the wiper arm 24 (the arm member 26 in this instance) can be more freely designed.

(2) The wiper arm 24 of the present embodiment includes the base member 25, which is connected to the pivot shaft 22 and is engaged with the one side of the coil spring 28 through the guide member 29, and the elongated arm member 26, which is installed to the base member 25. That is, the connection of the wiper arm 24 to the pivot shaft 22 and the engagement of the wiper arm 24 to each coil spring 28 are carried out only at the base member 25, so that it is only required to consider the design of the base member 25. Therefore, it is not required to consider the design of the arm member 26 with respect to these points, and thereby the higher degree of freedom can be achieved with respect to the shape of the arm member 26.

(3) The arm member 26 of the present embodiment is detachably installed to the base member 25. Thus, for example, replacement of the arm member 26 can be carried out at the low costs. In other words, since the replacement of the arm member 26 is possible, the wiper pivot (the pivot shaft 22, the swing lever 23 and the coil springs 28) and the base member 25 can be standardized or can be universally used (i.e., can be commonly used among various types of wiper apparatuses).

(4) The base member 25 of the present embodiment includes the fixation shaft 25b, which is generally parallel to the pivot shaft 22, and the arm member 26 is installed to the fixation shaft 25b in such a manner that the position of the arm member 26 is adjustable about the fixation shaft 25b. In this way, the arm member 26 can be easily and reliably installed to the desired position.

(5) In the present embodiment, when the wiper arm 24 is pivoted about the pivot axis (the axis of the connecting pin 27) relative to the pivot shaft 22, the urging force of each coil spring 18 is changed between the urging force, which urges the wiper arm 24 toward the wiping surface 101, and the urging force, which urges the wiper arm 24 away from the wiping surface 101. That is, the urging of the wiper arm 24 toward the wiping surface 101 (toward the wiping operational position) and the urging of the wiper arm 24 away from the wiping surface 101 (toward the lifted position) are carried out with the single type of coil spring 28. Therefore, it is possible to simplify the structure for implementing the rocking back and forth of the wiper arm 24 to selectively place and hold the wiper arm 24 in one of the wiping operational position and the lifted position.

(6) In the present embodiment, each guide member 29 is interposed between the base member 25 of the wiper arm 24 and the coil spring 28, and each guide member 29 is used as the conducting member, which indirectly conducts the urging force of the corresponding coil spring 28 to the base member 25 of the wiper arm 24. Specifically, the coil spring 28 requires the relatively large installation space due to its spirally coiled structure. Furthermore, since the coil spring 28 is moved integrally with the wiper arm 24, the swing lever 23 and the pivot shaft 22, the interference of the coil spring 28, which occupies the relative large space, relative to the other surrounding components needs to be considered. However, with the elaborate design of the guide member 29 of the present embodiment, the degree of freedom with respect to the placement of the coil spring 28 is advantageously improved to avoid the interference with the other surrounding components. Thereby, the installability of the wiper apparatus to the vehicle can be improved.

(7) The guide members 29, which serve as the conducting members of the present embodiment, are placed on the opposed lateral sides, respectively, of the wiper arm 24 (the base member 25) and are connected to the wiper arm 24 (the base member 25). Furthermore, the coil springs 28 are installed to these guide members 29, respectively. Thus, the urging forces of the coil springs 28, which are required to urge the wiper arm 24, can be applied to the wiper arm 24 in good balance, and thereby it is possible to limit generation of a twisting force relative to the pivot shaft 22. Furthermore, the coil springs 28 are provided in a pair, so that the required urging forces can be effectively split by the coil springs 28. Thereby, the outer diameter of the wire of the coil spring 28 can be advantageously reduced, and the outer diameter of the coil main body of the coil spring 28 can be also advantageously reduced. As a result, the total size of the wiper apparatus can be advantageously reduced.

Third Embodiment

A third embodiment of the present invention will be described with reference to the accompanying drawings. In the present embodiment, the use of the urging member, which urges the distal end portion of the wiper arm toward the wiping surface and is placed between the wiper arm and the swing lever, is the same as that of the first and second embodiments. However, unlike the first and second embodiments, a single compression coil spring is used as an urging member and is placed to extend in a direction generally parallel to the plane of the swing lever in the present embodiment.

Specifically, in a wiper apparatus 10c of the present embodiment shown in FIGS. 5A and 5B, a pivot shaft 32 is received through a cylindrical pivot holder 31 installed to the body of the vehicle and is supported in the pivotable manner about the pivot axis thereof. A base end portion (a lower end portion) of the pivot shaft 32 is fixed to a base end portion of a generally planar swing lever 33. The plane of the swing lever 33 extends in a direction, which is generally perpendicular to the pivot axis of the pivot shaft 32. The link mechanism, which is driven by the wiper motor, is connected to a distal end portion of the swing lever 33 through the ball pin 110.

The wiper arm 34 is installed to the distal end portion (the upper end portion) of the pivot shaft 32. The wiper arm 34 includes a base member 35 and an elongated arm member 36.

The base member 35 is located at a base end portion of the wiper arm 34, and the arm member 36 is fixed to the base member 35. A base end portion of the base member 35 has two connecting elements 35a, between which a connecting element 32a located at the distal end portion of the pivot shaft 32 is held. In a state where the connecting element 32a is held between the connecting elements 35a, a connecting pin 37 is installed through receiving holes of the connecting elements 35a and of the connecting element 32a in a direction generally perpendicular to the pivot axis of the pivot shaft 32. In the base member 35, the pivot axis of the connecting pin 37 extends in a direction generally perpendicular to the pivot axis of the pivot shaft 32. The base member 35 is connected to the distal end portion of the pivot shaft 32 through the connecting pin 37 in such a manner that the base member 35 is pivotable about the pivot axis (the axis of the connecting pin 37) relative to the pivot shaft 32. The arm member 36 is detachably fixed to the base member 35.

A fixation shaft 35b projects upward from a distal end portion of the base member 35. A distal end portion of the fixation shaft 35b has a male thread 35c, to which the arm member 36 is fixed. A receiving hole of the base end portion of the arm member 36 receives the fixation shaft 35b therethrough, and a nut (not shown) is tightly screwed over the male thread 35c at the distal end portion of the fixation shaft 35b upon adjustment of a position of the arm member 36 about the fixation shaft 35b.

A connecting element 35d extends downward from one of the connecting elements 35a of the base member 35. A guide member 39, which receives and supports a coil spring (compression coil spring) 38, is installed to a lower end portion of the connecting element 35d of the base member 35 by a connecting pin 40. The connecting pin 40 extends in a direction generally parallel to the connecting pin 37. The guide member 39 is configured into an L-shape. A distal end portion of a shorter arm of the L-shaped guide member 39 is pivotably connected to the connecting element 35d through the connecting pin 40. A longer arm of the L-shaped guide member 39 receives the coil spring 38, and a distal end portion of the longer arm of the L-shaped guide member 39 is inserted through an engaging hole 33b of a corresponding engaging portion 33a of the swing lever 33. On the lateral side of the pivot holder 31 (the pivot shaft 32), the coil spring 38 is placed on one lateral side of the swing lever 33 to extend in the direction generally parallel to the plane of the swing lever 33, i.e., to extend in the direction generally perpendicular to the pivot axis of the pivot shaft 32. The coil spring 38 exerts the expansion force between the engaging portion 33a and the connecting pin 40 through the guide member 39.

Figure 6A:
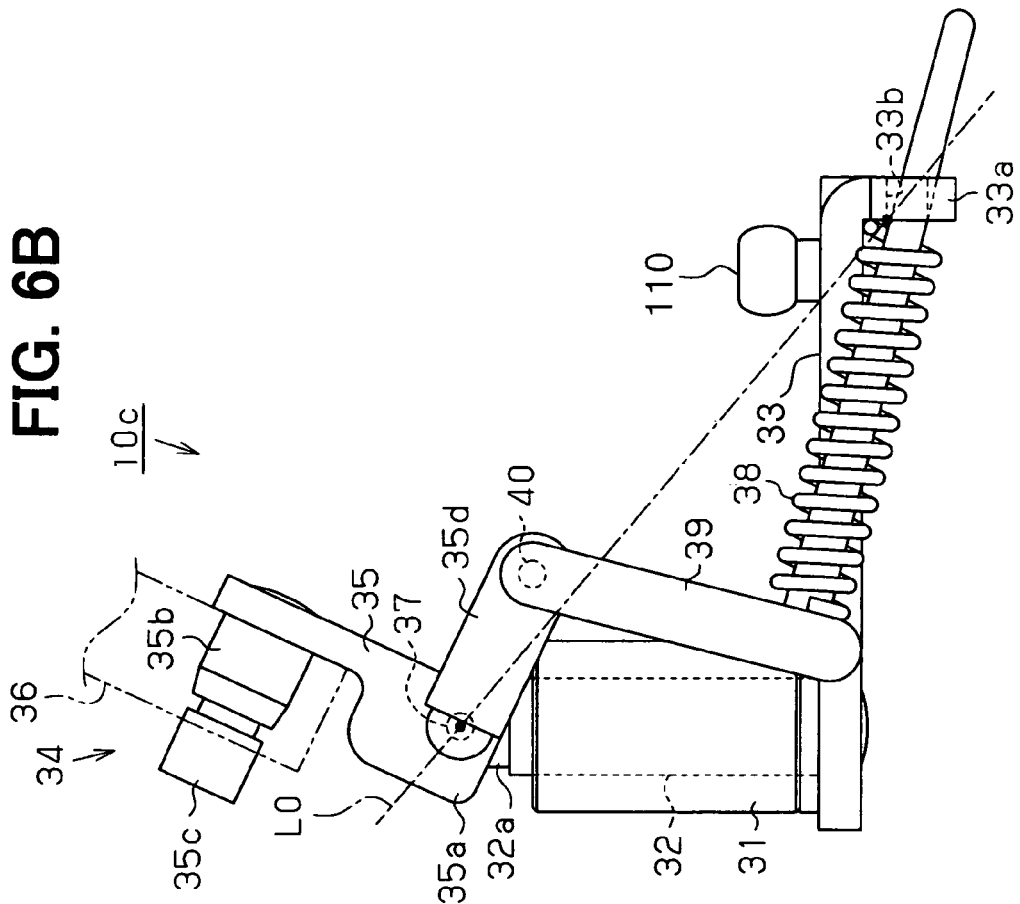
FIG. 6A is a side view showing the wiper apparatus of the third embodiment in a set position.

In this case, in the set position of the wiper arm 34 shown in FIG. 6A, the connecting pin 40, which is installed to the base member 35, is located on a base side (side opposite from the distal side where the distal end of the wiper arm 34 is located) of an imaginary line L0, which connects between the pivot axis (the axis of the connecting pin 37) of the base member 35 and the engaging point of the engaging portion 33a of the swing lever 33. Thus, at the set position of the wiper arm 34, due to the expansion force of the coil spring 38, which is exerted between the engaging portion 33a and the connecting pin 40, the distal end portion of the base member 35 is urged downward about the connecting pin 37. This urging force urges the distal end portion of the wiper arm 34 toward the wiping surface 101 to urge the wiper blade 100, which is installed to the distal end portion of the wiper arm 34, toward the wiping surface 101.

Figure 6B:
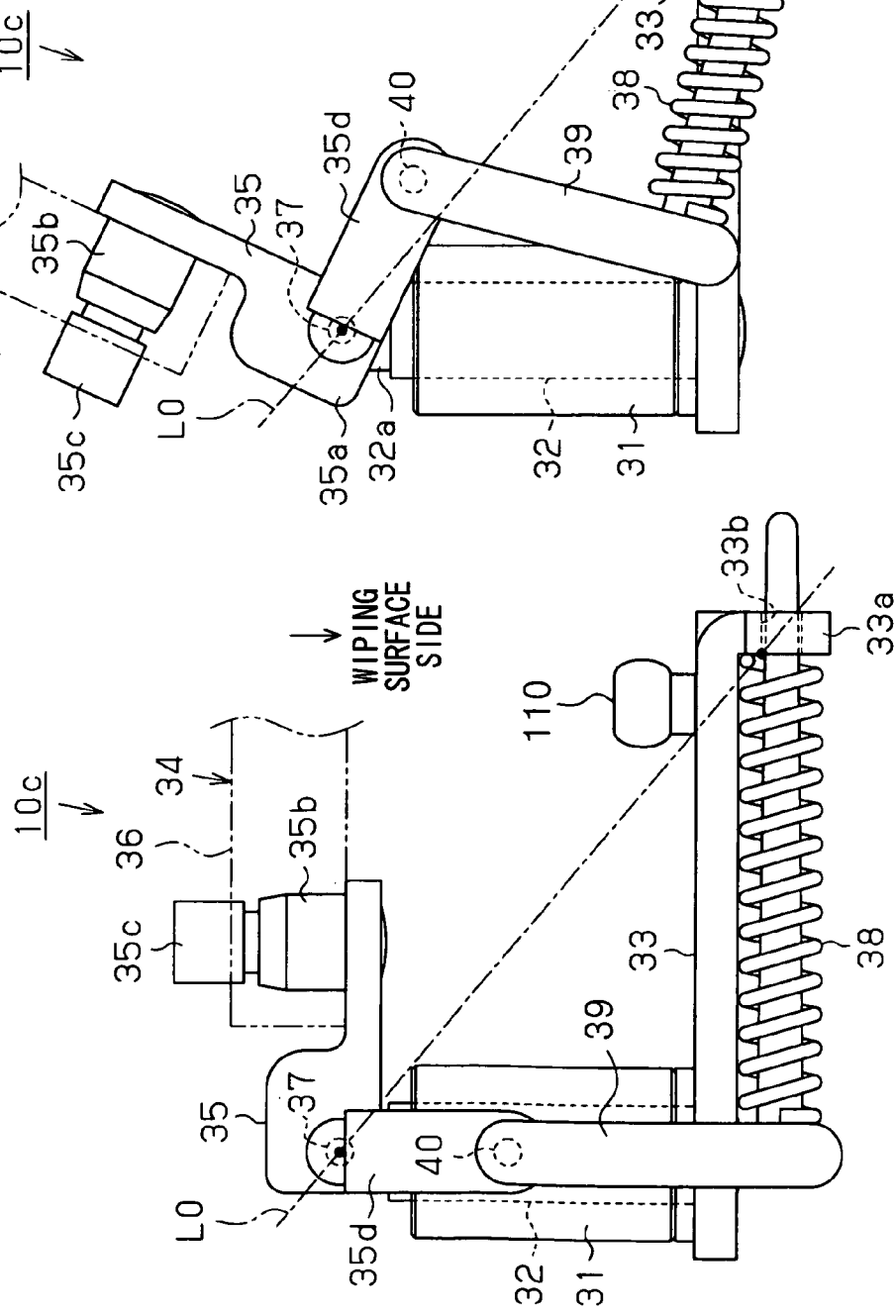
FIG. 6B is a side view showing the wiper apparatus of the third embodiment in a rock-back position.

In the state shown in FIG. 6A, when the distal end portion of the wiper arm 34 is pivoted backward away from the wiping surface 101, the connecting pin 40 installed to the base member 35 passes the imaginary line L0, which connects between the pivot axis (the axis of the connecting pin 37) of the base member 35 and the engaging point of the engaging portion 33a of the swing lever 33, as shown in FIG. 6B. Thus, the expansion force, which is exerted between the engaging portion 33a and the connecting pin 40, is shifted to act as an urging force, which urges the wiper arm 34 in a lifting direction thereof (a direction away from the wiping surface 101). Thereby, the wiper arm 34 is held in a predetermined lifted position (rock-back position).

In the case of the wiper apparatus 10c of the present embodiment, at the time of the wiping operation, the swing lever 33 is reciprocally pivoted within the predetermined angular range through the action of the link mechanism, and thereby the wiper arm 34 is reciprocally pivoted within the predetermined angular range through the pivot shaft 32. At this time, the swing lever 33 and the base member 35 of the wiper arm 34 are pivoted together about the pivot shaft 32. Thus, the coil spring 38 and the guide member 39 are reciprocally driven in the circumferential direction around the outer peripheral surface of the pivot holder 31 without causing substantial torsion of the coil spring 38 and the guide member 39. That is, the coil spring 38 and the associated guide member 39 are placed at the outside of the wiper arm 34 (specifically, the arm member 36). The coil spring 38 and the associated guide member 39 are moved integrally with the wiper arm 34, the swing lever 33 and the pivot shaft 32 and urge the wiper arm 34 toward the wiping surface 101. As described above, when the coil spring 38 is placed between the wiper arm 34 (the base member 35) and the swing lever 33, it is no longer required to consider the installation of the urging member in the arm member 36. Thereby, the shape of the arm member 36 can be more freely designed.

Next, advantages of the present embodiment will be described.

(1) In the present embodiment, the base end portion of the wiper arm 34 is connected to the distal end portion of the pivot shaft 32 in the pivotable manner, so that the distal end portion of the wiper arm 34 is pivotable toward or away from the wiping surface 101. Furthermore, the swing lever 33 is fixed to the base end portion of the pivot shaft 32. The coil spring 38, which is the urging member, is hooked between, i.e., is engaged (indirectly connected) between the base member 35 of the wiper arm 34 and the swing lever 33 to exert the urging force therebetween. That is, the wiper arm 34, the swing lever 33 and the pivot shaft 32 are integrally moved while urging the wiper arm 34 toward the wiping surface 101 in the state where the coil spring 38 and its associated guide member 39 are placed at the outside of the wiper arm 34. In this way, it is no longer required to consider the reception of the urging member (the coil spring 38) in the wiper arm 34. Thereby, the shape of the wiper arm 34 (the arm member 36 in this instance) can be more freely designed.

(2) The wiper arm 34 of the present embodiment includes the base member 35, which is connected to the pivot shaft 32 and is engaged with the one side of the coil spring 38 through the guide member 39, and the elongated arm member 36, which is installed to the base member 35. That is, the connection of the wiper arm 34 to the pivot shaft 32 and the engagement of the wiper arm 34 to the coil spring 38 are carried out only at the base member 35, so that it is only required to consider the design of the base member 35. Therefore, it is not required to consider the design of the arm member 36 with respect to these points, and thereby the higher degree of freedom can be achieved with respect to the shape of the arm member 36.

(3) The arm member 36 of the present embodiment is detachably installed to the base member 35. Thus, for example, replacement of the arm member 36 can be carried out at the low costs. In other words, since the replacement of the arm member 36 is possible, the wiper pivot (the pivot shaft 32, the swing lever 33 and the coil spring 38) and the base member 35 can be standardized or can be universally used (i.e., can be commonly used among various types of wiper apparatuses).

(4) The base member 35 of the present embodiment includes the fixation shaft 35b, which is generally parallel to the pivot shaft 32, and the arm member 36 is installed to the fixation shaft 35b in such a manner that the position of the arm member 36 is adjustable about the fixation shaft 35b. In this way, the arm member 36 can be easily and reliably installed to the desired position.

(5) In the present embodiment, when the wiper arm 34 is pivoted about the pivot axis (the axis of the connecting pin 37) relative to the pivot shaft 32, the urging force of the coil spring 38 is changed between the urging force, which urges the wiper arm 34 toward the wiping surface 101, and the urging force, which urges the wiper arm 34 away from the wiping surface 101. That is, the urging of the wiper arm 34 toward the wiping surface 101 (toward the wiping operational position) and the urging of the wiper arm 34 away from the wiping surface 101 (toward the lifted position) are carried out with the single type of coil spring 38. Therefore, it is possible to simplify the structure for implementing the rocking back and forth of the wiper arm 34 to selectively place and hold the wiper arm 34 in one of the wiping operational position and the lifted position.

(6) In the present embodiment, the guide member 39 is interposed between the base member 35 of the wiper arm 34 and the coil spring 38, and the guide member 39 is used as the conducting member, which indirectly conducts the urging force of the coil spring 38 to the base member 35 of the wiper arm 34. Specifically, the coil spring 38 requires the relatively large installation space due to its spirally coiled structure. Furthermore, since the coil spring 38 is moved integrally with the wiper arm 34, the swing lever 33 and the pivot shaft 32, the interference of the coil spring 38, which occupies the relative large space, relative to the other surrounding components needs to be considered. However, with the elaborate design of the guide member 39 of the present embodiment, the degree of freedom with respect to the placement of the coil spring 38 is advantageously improved to avoid the interference with the other surrounding components. Thereby, the installability of the wiper apparatus to the vehicle can be improved. In the present embodiment, the coil spring 38 is placed to extend in the direction generally parallel to the plane of the swing lever 33 to avoid the interference with the components around the pivot holder 31. Thus, the installability of the wiper apparatus to the vehicle can be improved.

Fourth Embodiment

A fourth embodiment of the present invention will be described with reference to the accompanying drawings. In the present embodiment, the use of the urging member, which urges the distal end portion of the wiper arm toward the wiping surface and is placed between the wiper arm and the swing lever, is the same as that of the first to third embodiments. However, unlike the first to third embodiments, a single tension coil spring is used as an urging member and is placed to extend in a direction generally parallel to the plane of the swing lever in the present embodiment.

Specifically, in a wiper apparatus 10d of the present embodiment shown in FIGS. 7A and 7B, a pivot shaft 42 is received through a cylindrical pivot holder 41 installed to the body of the vehicle and is supported in the pivotable manner about the pivot axis thereof. A base end portion (a lower end portion) of the pivot shaft 42 is fixed to a base end portion of a generally planar swing lever 43. The plane of the swing lever 43 extends in a direction, which is generally perpendicular to the pivot axis of the pivot shaft 42. The link mechanism, which is driven by the wiper motor, is connected to a distal end portion of the swing lever 43 through the ball pin 110.

The wiper arm 44 is installed to the distal end portion (the upper end portion) of the pivot shaft 42. The wiper arm 44 includes a base member 45 and an elongated arm member 46. The base member 45 is located at a base end portion of the wiper arm 44, and the arm member 46 is fixed to the base member 45. A base end portion of the base member 45 has two connecting elements 45a, between which a connecting element 42a located at the distal end portion of the pivot shaft 42 is held. In a state where the connecting element 42a is held between the connecting elements 45a, a connecting pin 47 is installed through receiving holes of the connecting elements 45a and of the connecting element 42a in a direction generally perpendicular to the pivot axis of the pivot shaft 42. In the base member 45, the pivot axis of the connecting pin 47 extends in a direction generally perpendicular to the pivot axis of the pivot shaft 42. The base member 45 is connected to the distal end portion of the pivot shaft 42 through the connecting pin 47 in such a manner that the base member 45 is pivotable about the pivot axis (the axis of the connecting pin 47) relative to the pivot shaft 42. Furthermore, the arm member 46 is directly fixed to the base member 45.

Two primary levers 48 are placed on the opposed lateral sides, respectively, of the base member 45 and are pivotably connected to opposed lateral side surfaces, respectively, of a distal end portion of the base member 45 through connecting pins 49, which extend generally parallel to the connecting pin 47. Each primary lever 48 is configured into an elbow shape. Intermediate bent portions of the primary levers 48 are placed at the lateral sides, respectively, of the pivot shaft 42. The other end portions of the primary levers 48 hold an end portion of a secondary lever 50 therebetween and are pivotably connected to the end portion of the secondary lever 50 through connecting pins 51, respectively. The connecting pins 51 extend in a direction generally parallel to the connecting pins 49. The secondary lever 50 is lightly bent into an elbow shape. A center portion of the secondary lever 50 is pivotably connected to a base end portion of the swing lever 43 through a connecting pin 52, which extends in a direction generally parallel to the connecting pins 51. The other end portion of the secondary lever 50 is placed below the lower end surface of the swing lever 43 and has an engaging portion 50a. A portion of the swing lever 43 is bent to form an engaging portion 43a to correspond with the engaging portion 50a of the other end portion of the secondary lever 50. A coil spring (tension coil spring) 53 is hooked, i.e., is engaged between the engaging portion 43a and the engaging portion 50a.

The coil spring 53 includes a spirally coiled spring main body 53a and two hooks 53b, 53c. The hooks 53b, 53c are provided at opposed ends, respectively, of the spring main body 53a. The hook 53b is hooked to the engaging portion 50a of the secondary lever 50, and the hook 53c is hooked to the engaging portion 43a of the swing lever 43. The coil spring 53 extends in a direction generally parallel to the plane of the swing lever 43, i.e., extends in a direction generally perpendicular to the pivot axis of the pivot shaft 42 at the lateral side of the swing lever 43. On the opposed lateral sides (first and second lateral sides) of the pivot holder 41 (the pivot shaft 42), the coil spring 38 exerts the tensile force between the engaging portion 43a and the connecting pins 49 through the levers 48, 50. Here, the primary lever 48 on the one lateral side of the pivot holder 41 and of the wiper arm 44 serves as a first side conducting member, and the other primary lever 48 on the other lateral side of the pivot holder 41 and of the wiper arm 44 serves as a second side conducting member.

In this case, in the set position of the wiper arm 44 shown in FIG. 8A, the connecting pin 49 installed to the base member 45 is located on a distal side (side where the distal end of the wiper arm 44 is located) of an imaginary line L0, which connects between the pivot axis (the axis of the connecting pin 47) of the base member 45 and the pivot axis (the axis of the connecting pin 51) of the primary and secondary levers 48, 50. Thus, at the set position of the wiper arm 44, due to the tensile force of the coil spring 53, which is exerted between the engaging portion 50a of the secondary lever 50 and the engaging portion 43a of the swing lever 43, the distal end portion of the base member 45 is urged downward about the connecting pin 47. This urging force urges the distal end portion of the wiper arm 44 toward the wiping surface 101 to urge the wiper blade 100, which is installed to the distal end portion of the wiper arm 44, toward the wiping surface 101.

In the state shown in FIG. 8A, when the distal end portion of the wiper arm 44 is pivoted backward away from the wiping surface 101, the connecting pin 49 installed to the base member 45 passes the imaginary line L0, which connects between the pivot axis (the axis of the connecting pin 47) of the base member 45 and the pivot axis (the axis of the connecting pin 51) of the primary and secondary levers 48, 50. Thus, the tensile force, which is exerted between the engaging portion 50a of the secondary lever 50 and the engaging portion 43a of the swing lever 43, is shifted to act as an urging force, which urges the wiper arm 44 in a lifting direction thereof (a direction away from the wiping surface 101). Thereby, the wiper arm 44 is held in a predetermined lifted position (rock-back position).

In the case of the wiper apparatus 10d of the present embodiment, at the time of the wiping operation, the swing lever 43 is reciprocally pivoted within the predetermined angular range through the action of the link mechanism, and thereby the wiper arm 44 is reciprocally pivoted within the predetermined angular range through the pivot shaft 42. At this time, the swing lever 43 and the base member 45 of the wiper arm 44 are pivoted together about the pivot shaft 42. Thus, the coil spring 53 and the levers 48, 50 are reciprocally driven in the circumferential direction around the outer peripheral surface of the pivot holder 41 without causing substantial torsion of the coil spring 58 and the levers 48, 50. That is, the coil spring 53 and each associated lever 48, 50 are placed at the outside of the wiper arm 44 (specifically, the arm member 46). The coil spring 53 and each associated lever 48, 50 are moved integrally with the wiper arm 44, the swing lever 43 and the pivot shaft 42 and urge the wiper arm 44 toward the wiping surface 101. As described above, when the coil spring 53 is placed between the wiper arm 44 (the base member 45) and the swing lever 43, it is no longer required to consider the installation of the urging member in the arm member 46. Thereby, the shape of the arm member 46 can be more freely designed.

Next, advantages of the present embodiment will be described.

(1) In the present embodiment, the base member 45, which is provided at the base end portion of the wiper arm 44, is connected to the distal end portion of the pivot shaft 42 in the pivotable manner, so that the distal end portion of the wiper arm 44 is pivotable toward or away from the wiping surface 101. Furthermore, the swing lever 43 is fixed to the base end portion of the pivot shaft 42. The coil spring 53, which is the urging member, is hooked between, i.e., is engaged (indirectly connected) between the base member 45 of the wiper arm 44 and the swing lever 43 through the levers 48, 50 to exert the urging force therebetween. That is, the wiper arm 44, the swing lever 43 and the pivot shaft 42 are integrally moved while urging the wiper arm 44 toward the wiping surface 101 in the state where the coil spring 53 and its associated levers 48, 50 are placed at the outside of the wiper arm 44. In this way, it is no longer required to consider the reception of the urging member (the coil spring 53) in the wiper arm 44. Thereby, the shape of the wiper arm 44 (the arm member 46 in this instance) can be more freely designed.

(2) The wiper arm 44 of the present embodiment includes the base member 45, which is connected to the pivot shaft 42 and is engaged with (indirectly connected to) the one side of the coil spring 53 through the primary and secondary levers 48, 50, and the elongated arm member 46, which is installed to the base member 45. That is, the connection of the wiper arm 44 to the pivot shaft 42 and the engagement of the wiper arm 44 to the coil spring 58 are carried out only at the base member 45, so that it is only required to consider the design of the base member 45. Therefore, it is not required to consider the design of the arm member 46 with respect to these points, and thereby the higher degree of freedom can be achieved with respect to the shape of the arm member 46.

(3) In the present embodiment, when the wiper arm 44 is pivoted about the pivot axis (the axis of the connecting pin 47) relative to the pivot shaft 22, the urging force of the coil spring 53 is changed between the urging force, which urges the wiper arm 44 toward the wiping surface 101, and the urging force, which urges the wiper arm 44 away from the wiping surface 101. That is, the urging of the wiper arm 44 toward the wiping surface 101 (toward the wiping operational position) and the urging of the wiper arm 44 away from the wiping surface 101 (toward the lifted position) are carried out with the single type of coil spring 53. Therefore, it is possible to simplify the structure for implementing the rocking back and forth of the wiper arm 44 to selectively place and hold the wiper arm 44 in one of the wiping operational position and the lifted position.

(4) In the present embodiment, the primary and secondary levers 48, 50 are interposed between the base member 45 of the wiper arm 44 and the coil spring 53, and the primary and secondary levers 48, 50 are used as the conducting members, which indirectly conduct the urging force of the coil spring 53 to the base member 45 of the wiper arm 44. Specifically, the coil spring 53 requires the relatively large installation space due to its spirally coiled structure. Furthermore, since the coil spring 53 is moved integrally with the wiper arm 44, the swing lever 43 and the pivot shaft 42, the interference of the coil spring 53, which occupies the relative large space, relative to the other surrounding components needs to be considered. However, with the elaborate design of the levers 48, 50 of the present embodiment, the degree of freedom with respect to the placement of the coil spring 53 is advantageously improved to avoid the interference with the other surrounding components. Thereby, the installability of the wiper apparatus to the vehicle can be improved. In the present embodiment, the coil spring 53 is placed to extend in the direction generally parallel to the plane of the swing lever 43 to avoid the interference with the components around the pivot holder 41. Thus, the installability of the wiper apparatus to the vehicle can be improved.

(5) The primary levers 48 of the present embodiment, which serve as the conducting members, are connected to the wiper arm 44 (the base member 45) on the opposed lateral sides, respectively, of the wiper arm 44 (the base member 45). Thus, the urging force, which is required to urge the wiper arm 44, can be applied to the wiper arm 44 (the base member 45) in good balance on the opposed lateral sides of the wiper arm 44. Thereby, it is possible to limit generation of a twisting force relative to the pivot shaft 42. Furthermore, in the present embodiment, although the single coil spring 53 is used, the urging forces, which are required to urge the wiper arm 44, are well balanced at the opposed lateral sides of the wiper arm 44 due to the primary levers 48, which conduct the urging force of the coil spring 53 and are provided on the opposed lateral sides, respectively, of the wiper arm 44, while enabling a reduction in the number of the components.

Fifth Embodiment

A fifth embodiment of the present invention will be described with reference to the accompanying drawings. In the present embodiment, the use of the urging member, which urges the distal end portion of the wiper arm toward the wiping surface and is placed between the wiper arm and the swing lever, is the same as that of the first to fourth embodiments. In the present embodiment, similar to the fourth embodiment, a single tension coil spring is used as an urging member and is connected to the wiper arm through primary and secondary levers. However, the structure of each of the primary and secondary levers is different from that of the fourth embodiment.

Figure 9:
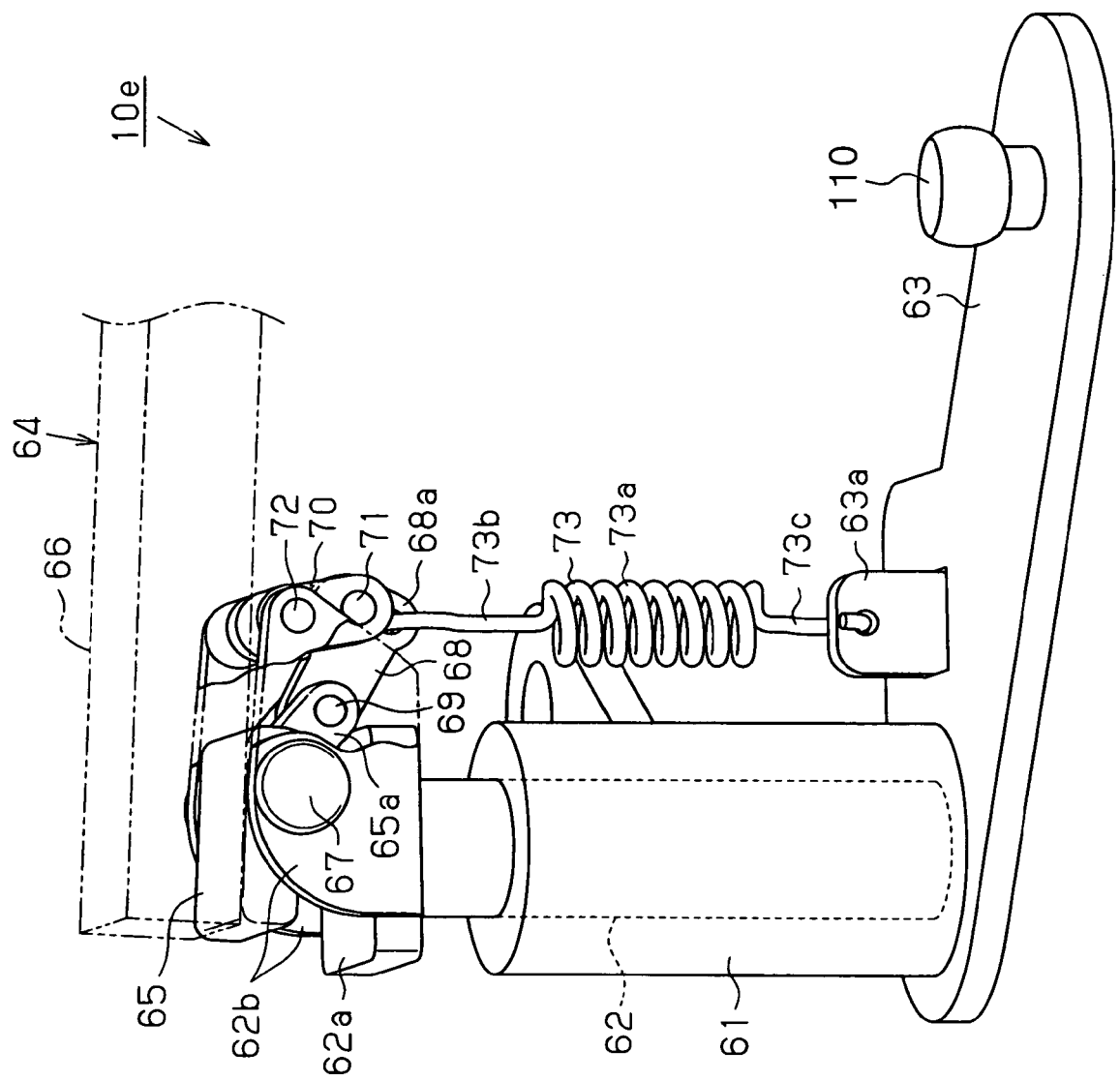
FIG. 9 is a top perspective view of a wiper apparatus according to fifth embodiment of the present invention.

Specifically, in a wiper apparatus 10e of the present embodiment shown in FIG. 9, a pivot shaft 62 is received through a cylindrical pivot holder 61 installed to the body of the vehicle and is supported in the pivotable manner about the pivot axis thereof. A base end portion (a lower end portion) of the pivot shaft 62 is fixed to a base end portion of a generally planar swing lever 63. The plane of the swing lever 63 extends in a direction, which is generally perpendicular to the pivot axis of the pivot shaft 62. The link mechanism, which is driven by the wiper motor, is connected to a distal end portion of the swing lever 63 through the ball pin 110.

A wiper arm 64 is installed to the distal end portion (the upper end portion) of the pivot shaft 62. The wiper arm 64 includes a base member 65 and an elongated arm member 66. The base member 65 is located at a base end portion of the wiper arm 64, and the arm member 66 is fixed to the base member 65. The base member 65 is held between two connecting elements 62b of a connecting portion 62a, which is provided integrally at the distal end portion of the pivot shaft 62. In this state, a connecting pin 67 is installed through receiving holes of the connecting elements 62b and of the base member 65 in a direction generally perpendicular to the pivot axis of the pivot shaft 62. In the base member 65, the pivot axis of the connecting pin 67 extends in a direction generally perpendicular to the pivot axis of the pivot shaft 62. The base member 65 is connected to the distal end portion of the pivot shaft 62 through the connecting pin 67 in such a manner that the base member 65 is pivotable about the pivot axis (the axis of the connecting pin 67) relative to the pivot shaft 62. Furthermore, the arm member 66 is directly fixed to the base member 65.

A connecting portion 65a is provided to the base member 65 to extend distally downward toward the distal end portion of the wiper arm 64. One end portion of a primary lever 68 is pivotably connected to a widthwise center part (a center part in a width direction of the wiper arm 64, which is perpendicular to a plane of FIG. 10A) of a distal end portion of the connecting portion 65a through a connecting pin 69, which extends in a direction generally parallel to the connecting pin 67. The primary lever 68 is placed to extend distally downward in a direction that generally coincides with the extending direction of the connecting portion 65a. The other end portion of the primary lever 68 is pivotably connected to one end portion of a secondary lever 70 through a connecting pin 71. The connecting pin 71 extends in a direction generally parallel to the connecting pin 69. The secondary lever 70 is slightly shorter than the primary lever 68. The other end portion of the secondary lever 70 is pivotably connected to distal end portions of the connecting elements 62b of the pivot shaft 62 through a connecting pin 72, which extends in a direction generally parallel to the connecting pin 71. The secondary lever 70 is directed downward in a direction generally parallel to the pivot axis of the pivot shaft 62. The levers 68, 70 are substantially received between the connecting elements 62b of the pivot shaft 62 except an engaging portion 68a described below.

The engaging portion 68a is formed at the other end portion of the primary lever 68, which is connected to the secondary lever 70. In the primary lever 68, the engaging portion 68a is provided at a location slightly below the connecting portion (the connecting pin 71), which is connected to the secondary lever 70. A portion of the swing lever 63 is cut and bent upward to form an engaging portion 63a to correspond with the engaging portion 68a of the other end portion of the primary lever 68. A coil spring (tension coil spring) 73 is hooked, i.e., is engaged between the engaging portion 63a and the engaging portion 68a.

The coil spring 73 includes a spirally coiled spring main body 73a and two hooks 73b, 73c. The hooks 73b, 73c are provided at opposed ends, respectively, of the spring main body 73a. The hook 73b is hooked to the engaging portion 68a of the primary lever 68, and the hook 73c is hooked to the engaging portion 63a of the swing lever 63. The coil spring 73 is placed on one lateral side of the pivot holder 61 (the pivot shaft 62) to extend generally in the axial direction of the pivot holder 11 (generally parallel to the pivot axis of the pivot shaft 12). The coil spring 73 exerts a tensile force between the engaging portion 63a and the engaging portion 68a through the levers 68, 70.

In this case, in the set position of the wiper arm 64 shown in FIG. 10A, the connecting pin 69 installed to the base member 65 (the connecting portion 65a) is located on a base side (side opposite from the distal side where the distal end of the wiper arm 64 is located) of an imaginary line L0, which connects between the pivot axis (the axis of the connecting pin 67) of the base member 65 and the pivot axis (the axis of the connecting pin 71) of the primary and secondary levers 68, 70. Thus, at the set position of the wiper arm 64, due to the tensile force of the coil spring 73, which is exerted between the engaging portion 68a of the primary lever 68 and the engaging portion 63a of the swing lever 63, the distal end portion of the base member 65 is urged downward about the connecting pin 67. This urging force urges the distal end portion of the wiper arm 64 toward the wiping surface 101 to urge the wiper blade 100, which is installed to the distal end portion of the wiper arm 64, toward the wiping surface 101.

In the state shown in FIG. 10A, when the distal end portion of the wiper arm 64 is pivoted backward away from the wiping surface 101, the connecting pin 69 installed to the base member 65 (the connecting portion 65a) passes the imaginary line L0, which connects between the pivot axis (the axis of the connecting pin 67) of the base member 65 and the pivot axis (the axis of the connecting pin 71) of the primary and secondary levers 68, 70. Thus, the tensile force, which is exerted between the engaging portion 68a of the primary lever 68 and the engaging portion 63a of the swing lever 63, is shifted to act as an urging force, which urges the wiper arm 64 in a lifting direction thereof (a direction away from the wiping surface 101). Thereby, the wiper arm 64 is held in a predetermined lifted position (rock-back position). Furthermore, in the present embodiment, the primary and secondary levers 68, 70 are set such that the movement of the coil spring 73 is very small at the time of moving the wiper arm 64 from the set position to the rock-back position to avoid the interference with the surrounding components around the coil spring 73.

In the case of the wiper apparatus 10e of the present embodiment, at the time of the wiping operation, the swing lever 63 is reciprocally pivoted within the predetermined angular range through the action of the link mechanism, and thereby the wiper arm 64 is reciprocally pivoted within the predetermined angular range through the pivot shaft 62. At this time, the swing lever 63 and the base member 65 of the wiper arm 64 are pivoted together about the pivot shaft 62. Thus, the coil spring 73 and the levers 68, 70 are reciprocally driven in the circumferential direction around the outer peripheral surface of the pivot holder 61 without causing substantial torsion of the coil spring 73 and the levers 68, 70. That is, the coil spring 73 and each associated lever 68, 70 are placed at the outside of the wiper arm 64 (specifically, the arm member 66). The coil spring 73 and each associated lever 68, 70 are moved integrally with the wiper arm 64, the swing lever 63 and the pivot shaft 62 and urge the wiper arm 64 toward the wiping surface 101. As described above, when the coil spring 73 is placed between the wiper arm 64 (the base member 65) and the swing lever 63, it is no longer required to consider the installation of the urging member in the arm member 66. Thereby, the shape of the arm member 66 can be more freely designed.

Next, advantages of the present embodiment will be described.

(1) In the present embodiment, the base member 65, which is provided at the base end portion of the wiper arm 64, is connected to the distal end portion of the pivot shaft 62 in the pivotable manner, so that the distal end portion of the wiper arm 64 is pivotable toward or away from the wiping surface 101. Furthermore, the swing lever 63 is fixed to the base end portion of the pivot shaft 62. The coil spring 73, which is the urging member, is hooked between, i.e., is engaged (indirectly connected) between the base member 65 of the wiper arm 64 and the swing lever 63 through the levers 68, 70 to exert the urging force therebetween. That is, the wiper arm 64, the swing lever 63 and the pivot shaft 62 are integrally moved while urging the wiper arm 64 toward the wiping surface 101 in the state where the coil spring 73 and its associated levers 68, 70 are placed at the outside of the wiper arm 64. In this way, it is no longer required to consider the reception of the urging member (the coil spring 73) in the wiper arm 64. Thereby, the shape of the wiper arm 64 (the arm member 66 in this instance) can be more freely designed.

(2) The wiper arm 64 of the present embodiment includes the base member 65, which is connected to the pivot shaft 62 and is engaged with the one side of the coil spring 73 through the primary and secondary levers 68, 70, and the elongated arm member 66, which is installed to the base member 65. That is, the connection of the wiper arm 64 to the pivot shaft 62 and the engagement of the wiper arm 64 to the coil spring 73 are carried out only at the base member 65, so that it is only required to consider the design of the base member 65. Therefore, it is not required to consider the design of the arm member 66 with respect to these points, and thereby the higher degree of freedom can be achieved with respect to the shape of the arm member 66.

(3) In the present embodiment, when the wiper arm 64 is pivoted about the pivot axis (the axis of the connecting pin 67) relative to the pivot shaft 62, the urging force of the coil spring 73 is changed between the urging force, which urges the wiper arm 64 toward the wiping surface 101, and the urging force, which urges the wiper arm 64 away from the wiping surface 101. That is, the urging of the wiper arm 64 toward the wiping surface 101 (toward the wiping operational position) and the urging of the wiper arm 64 away from the wiping surface 101 (toward the lifted position) are carried out with the single type of coil spring 73. Therefore, it is possible to simplify the structure for implementing the rocking back and forth of the wiper arm 64 to selectively place and hold the wiper arm 64 in one of the wiping operational position and the lifted position.

(4) In the present embodiment, the primary and secondary levers 68, 70 are interposed between the base member 65 of the wiper arm 64 and the coil spring 73, and the primary and secondary levers 68, 70 are used as the conducting members, which indirectly conduct the urging force of the coil spring 73 to the base member 65 of the wiper arm 64. Specifically, the coil spring 73 requires the relatively large installation space due to its spirally coiled structure. Furthermore, since the coil spring 73 is moved integrally with the wiper arm 64, the swing lever 63 and the pivot shaft 62, the interference of the coil spring 73, which occupies the relative large space, relative to the other surrounding components needs to be considered. However, with the elaborate design of the levers 68, 70 of the present embodiment, the degree of freedom with respect to the placement of the coil spring 73 is advantageously improved to avoid the interference with the other surrounding components. Thereby, the installability of the wiper apparatus to the vehicle can be improved. In the present embodiment, each lever 68, 70 is set such that the amount of movement of the coil spring 73 is very small at the time of moving the wiper arm 64 from the set position to the rockback position, and vice versa. That is, the interference with the surrounding components around the coil spring 73 is avoided. Thus, the installability of the wiper apparatus to the vehicle can be improved.

(5) The primary lever 68 of the present embodiment, which serves as the conducting member, is connected to the widthwise center part of the wiper arm 64 (the base member 65). Thus, the urging force, which is required to urge the wiper arm 64, can be applied to the wiper arm 64 in good balance, and thereby it is possible to limit generation of a twisting force relative to the pivot shaft 62. Furthermore, in the present embodiment, although the single coil spring 73 is used, the urging force, which is required to urge the wiper arm 64, is well balanced at the center part of the wiper arm 64 due to the connection of the primary lever 68 to the widthwise center part of the wiper arm 64, while enabling a reduction in the number of the components.

Sixth Embodiment

A sixth embodiment of the present invention will be described with reference to the accompanying drawings. In the present embodiment, the use of the urging member, which urges the distal end portion of the wiper arm toward the wiping surface and is placed between the wiper arm and the swing lever, is the same as that of the first to fifth embodiments. In the present embodiment, a single tension coil spring is used as an urging member and is connected to the wiper arm. However, in the sixth embodiment, unlike the first to fifth embodiments, the coil spring is engaged between the arm member of the wiper arm and the swing lever.

Figure 11:
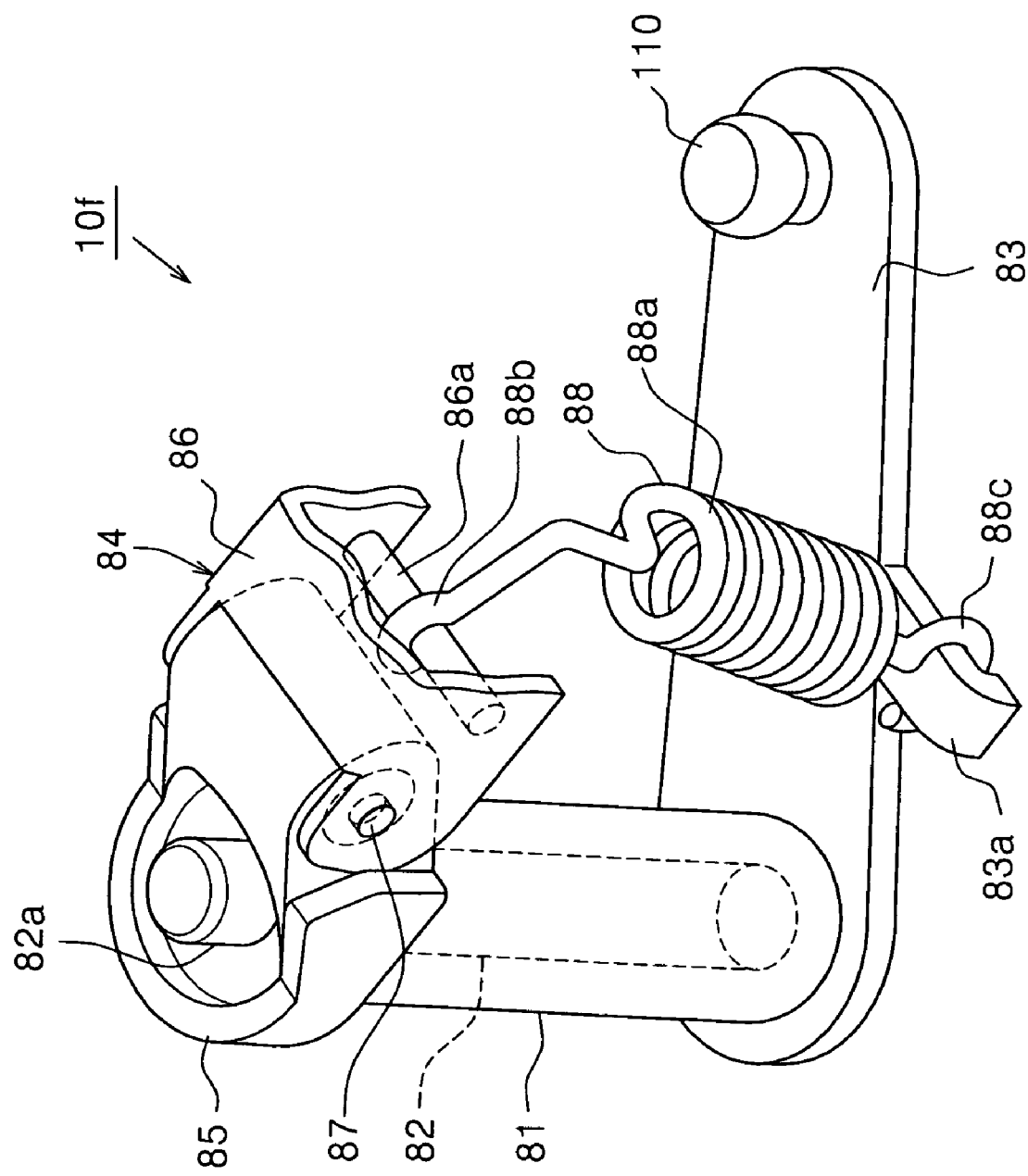
FIG. 11 is a top perspective view of a wiper apparatus according to a sixth embodiment of the present invention.

Specifically, in a wiper apparatus 10ƒ of the present embodiment shown in FIG. 11, a pivot shaft 82 is received through a cylindrical pivot holder 81 installed to the body of the vehicle and is supported in the pivotable manner about the pivot axis thereof. A base end portion (a lower end portion) of the pivot shaft 82 is fixed to a base end portion of a generally planar swing lever 83. The plane of the swing lever 83 extends in a direction, which is generally perpendicular to the pivot axis of the pivot shaft 82. The link mechanism, which is driven by the wiper motor, is connected to a distal end portion of the swing lever 83 through the ball pin 110.

A wiper arm 84 is installed to the distal end portion (the upper end portion) of the pivot shaft 82. The wiper arm 84 includes a base member 85 and an elongated arm member 86. The base member 85 is located at a base end portion of the wiper arm 84, and the arm member 86 is pivotably connected to the base member 85. The distal end portion of the pivot shaft 82, which includes a male thread 82a, is received through a receiving hole of the base member 85. A nut (not shown) is tightly screwed over the male thread 82a at the distal end portion of the pivot shaft 82 upon adjustment of a position of the base member 85 about the pivot shaft 82. A base end portion of the arm member 86 is pivotably connected to the base member 85 through a connecting pin 87, which extends in a direction generally perpendicular to the pivot axis of the pivot shaft 82, in such a manner that the arm member 86 is pivotable about the pivot axis (the axis of the connecting pin 87). An engaging portion (shaft) 86a is fixed to extend between opposed inner lateral wall surfaces of an inverted U-shaped portion of the arm member 86 in a direction generally parallel to the connecting pin 87 at the base end portion of the arm member 86.

An engaging portion 83a extends laterally at the swing lever 83 to correspond with the engaging portion 86a of the arm member 86. A coil spring (tension coil spring) 88 is hooked, i.e., is engaged between the engaging portion 83a and the engaging portion 86a.

Specifically, the coil spring 88 includes a spirally coiled spring main body 88a and two hooks 88b, 88c. The hooks 88b, 88c are provided at opposed ends, respectively, of the spring main body 88a. The hook 88b is hooked to an axial center part of the engaging portion 86a of the arm member 86, and the hook 88c is hooked to the engaging portion 83a of the swing lever 83. The coil spring 88 exerts a tensile force between the engaging portion 83a and the engaging portion 86a.

Figure 12A:
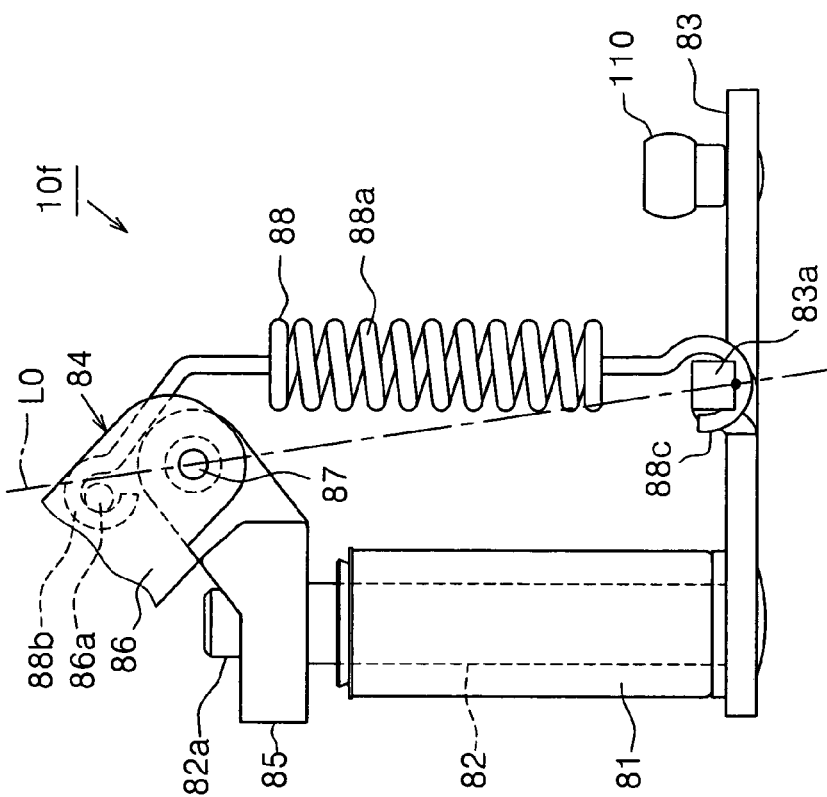
FIG. 12A is a side view showing the wiper apparatus of the sixth embodiment in a set position.

In this case, in the set position of the wiper arm 84 shown in FIG. 12A, the engaging portion 86a of the arm member 86 is located on a distal side (side where the distal end of the wiper arm 84 is located) of an imaginary line L0, which connects between the pivot axis (the axis of the connecting pin 87) of the arm member 86 and the engaging point of the engaging portion 83a of the swing lever 83. Thus, at the set position of the wiper arm 84, due to the tensile force of the coil spring 88, which is exerted between the engaging portion 83a and the engaging portion 86a, the distal end portion of the arm member 86 is urged downward about the connecting pin 87. This urging force urges the distal end portion of the wiper arm 84 toward the wiping surface 101 to urge the wiper blade 100, which is installed to the distal end portion of the wiper arm 84, toward the wiping surface 101.

Figure 12B:
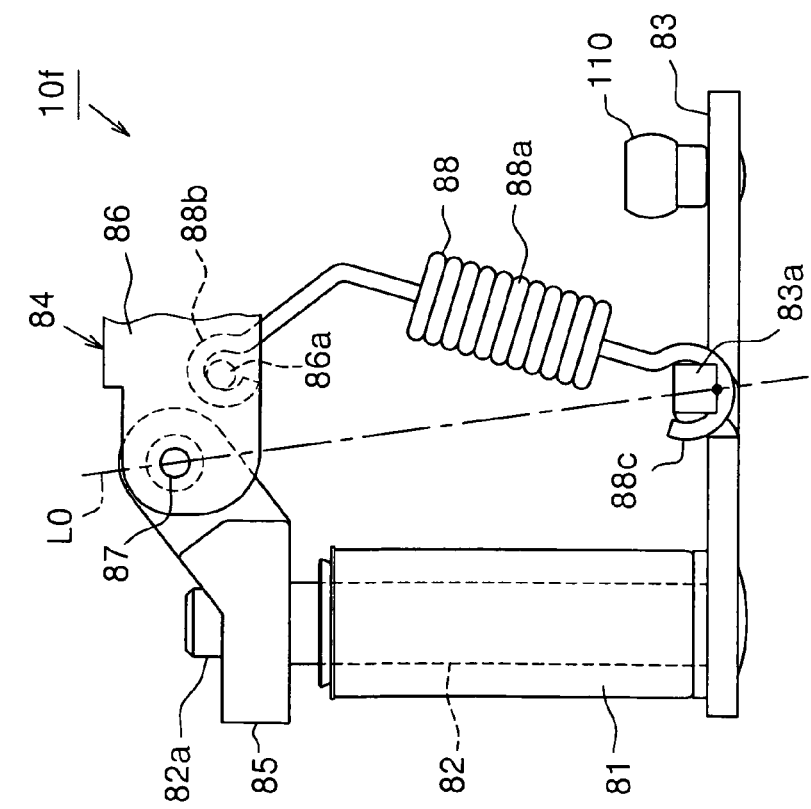
FIG. 12B is a side view showing the wiper apparatus of the sixth embodiment in a rock-back position.

In the state shown in FIG. 12A, when the distal end portion of the wiper arm 84 is pivoted backward away from the wiping surface 101, the engaging portion 86a of the arm member 86 passes the imaginary line L0, which connects between the pivot axis (the axis of the connecting pin 87) of the arm member 86 and engaging point of the engaging portion 83a of the swing lever 83, as shown in FIG. 12B. Thus, the tensile force, which is exerted between the engaging portion 83a and the engaging portion 86a, is shifted to act as an urging force, which urges the wiper arm 84 in a lifting direction thereof (a direction away from the wiping surface 101). Thereby, the wiper arm 84 is held in a predetermined lifted position (rock-back position).

In the case of the wiper apparatus 10f of the present embodiment, at the time of the wiping operation, the swing lever 83 is reciprocally pivoted within the predetermined angular range through the action of the link mechanism, and thereby the wiper arm 84 is reciprocally pivoted within the predetermined angular range through the pivot shaft 82. At this time, the swing lever 83, the base member 85 and the arm member 86 of the wiper arm 84 are pivoted together about the pivot shaft 82. Thus, the coil spring 88 is reciprocally driven in the circumferential direction around the outer peripheral surface of the pivot holder 81 without causing substantial torsion of the coil spring 18. Here, although the hook 88b of the coil spring 88 is engaged with the engaging portion 86a of the arm member 86 of the wiper arm 84, the spring main body 88a of the coil spring 88 is placed at the outside of the wiper arm 14 (specifically, the arm member 86). The coil spring 88 is moved integrally with the wiper arm 84, the swing lever 83 and the pivot shaft 82 and urges the wiper arm 84 toward the wiping surface 101. As described above, when the spring main body 88a of the coil spring 88 is placed between the wiper arm 84 (the base arm member 86) and the swing lever 83, it is no longer required to consider the installation of the most bulky part of urging member (specifically, the spring main body 88a of the coil spring 88) in the arm member 86, and it only required to consider the installation of the hook 88b of the coil spring 88, which has the relatively low profile, in the arm member 86. Thereby, the shape of the arm member 86 can be more freely designed.

Next, advantages of the present embodiment will be described.

(1) In the present embodiment, the base end portion of the wiper arm 84 is connected to the distal end portion of the pivot shaft 82 in the pivotable manner relative to the pivot shaft 82, so that the distal end portion of the wiper arm 84 is pivotable toward or away from the wiping surface 101. Furthermore, the swing lever 83 is fixed to the base end portion of the pivot shaft 82. The coil spring 88, which is the urging member, is hooked between, i.e., is engaged between the arm member 86 of the wiper arm 84 and the swing lever 83 to exert the urging force therebetween. That is, the wiper arm 84, the swing lever 83 and the pivot shaft 82 are integrally moved while urging the wiper arm 84 toward the wiping surface 101 in the state where the spring main body 88a of the coil spring 88 is placed at the outside of the wiper arm 84. In this way, it is no longer required to consider the reception of the most bulky part of the urging member (the spring main body 88a of the coil spring 18) in the wiper arm 84. Thereby, the shape of the wiper arm 84 (the arm member 86 in this instance) can be more freely designed.

(2) In the present embodiment, when the wiper arm 84 is pivoted about the pivot axis (the axis of the connecting pin 87) relative to the base member 85 and the pivot shaft 82, the urging force of the coil spring 88 is changed between the urging force, which urges the wiper arm 84 toward the wiping surface 101, and the urging force, which urges the wiper arm 84 away from the wiping surface 101. That is, the urging of the wiper arm 84 toward the wiping surface 101 (toward the wiping operational position) and the urging of the wiper arm 84 away from the wiping surface 101 (toward the lifted position) are carried out with the single type of coil spring 88. Therefore, it is possible to simplify the structure for implementing the rocking back and forth of the wiper arm 84 to selectively place and hold the wiper arm 84 in one of the wiping operational position and the lifted position.

(3) The hook 88b of the coil spring 88 is engaged to the center part of the engaging portion (the shaft) 86a, which is fixed to extend between opposed inner lateral wall surfaces of the inverted U-shaped portion of the arm member 86 of the wiper arm 84. Thus, the urging force, which is required to urge the wiper arm 84, can be applied to the wiper arm 84 (the arm member 86) in good balance. Thereby, it is possible to limit generation of a twisting force relative to the pivot shaft 82. Furthermore, in the present embodiment, although the single coil spring 88 is used, the urging force, which is required to urge the wiper arm 84, is well balanced at the opposed lateral sides of the wiper arm 84 due to the engagement of the coil spring 88 to the engaging portion (the shaft) 86a, which extends between the opposed inner lateral wall surfaces of the arm member 86.

The above embodiments may be modified as follows.

The structure of the above embodiments (e.g., the component shapes, the number of the components, and the positions of the components) may be modified in an appropriate manner. Furthermore, one or more components of one or more of the above embodiments may be combined with any other one or more of components of any other one or more of the above embodiments in an appropriate manner. In the above embodiments, the coil springs 18, 28, 38, 53, 73, 88 are used as the urging members. Alternatively, any other types of springs may be used as the urging members.

In each of the above embodiments, the arm member 16, 26, 36, 46, 66, 86 may be modified to cover the base member 15, 25, 35, 45, 65, 85. Furthermore, the base member and the arm member may be integrated together to form the wiper arm.

In each of the above embodiments, the wiper arm 14, 24, 34, 44, 64, 84 is constructed to enable the placement of the wiper arm 14, 24, 34, 44, 64, 84 to the rock-back position. However, the present invention may be equally applicable to a wiper apparatus, which is not constructed to enable the placement of the wiper arm to the rock-back position.

In each of the above embodiments, the wiper arm 14, 24, 34, 44, 64, 84 is pivoted about the pivot axis thereof, which is generally perpendicular to the pivot axis of the pivot shaft 12, 22, 32, 42, 62, 82, toward or away from the wiping surface. This angular relationship between the pivot axis of the wiper arm 14, 24, 34, 44, 64, 84 and the pivot axis of the pivot shaft 12, 22, 32, 42, 62, 82 may be modified as follows. That is, the wiper arm 14, 24, 34, 44, 64, 84 may be pivoted about the pivot axis thereof, which is tilted by an angle other than 90 degrees relative to the pivot axis of the pivot shaft 12, 22, 32, 42, 62, 82, toward or away from the wiping surface. This tilt angle may be determined depending on a relative position of the wiper apparatus relative to the wiping surface.

Additional advantages and modifications will readily occur to those skilled in the art. The invention in its broader terms is therefore not limited to the specific details, representative apparatus, and illustrative examples shown and described.

What is claimed is:

1. A wiper apparatus for wiping a wiping surface of a vehicle, comprising:
a pivot holder that is adapted to be installed to a body of the vehicle;

a pivot shaft that is supported by the pivot holder and is pivotable about a pivot axis thereof;

a swing member that is fixed to the pivot shaft to drive the pivot shaft about the pivot axis;

a wiper arm that is connected to a distal end portion of the pivot shaft, which is located on one axial side of the pivot holder and is opposite from the swing member in an axial direction of the pivot shaft, wherein the wiper arm is pivoted together with the pivot shaft about the pivot axis of the pivot shaft when the pivot shaft is driven by the swing member, and the wiper arm is pivotable about a pivot axis thereof, which is angled relative to the pivot axis of the pivot shaft, toward or away from the wiping surface; and at least one urging member that is placed at an outside of the wiper arm and has:

one end portion, which is located on the one axial side of the pivot holder and is directly or indirectly connected to the wiper arm; and another end portion, which is located on another axial side of the pivot holder and is directly or indirectly connected to the swing member, wherein the at least one urging member exerts an urging force to urge the wiper arm toward the wiping surface in a wiping operational position of the wiper arm for wiping the wiping surface.

2. The wiper apparatus according to claim 1, wherein the wiper arm includes:

a base member that is connected to the distal end portion of the pivot shaft and is directly or indirectly engaged with the one end portion of the at least one urging member; and an elongated arm member that is installed to the base member.

3. The wiper apparatus according to claim 2, wherein the arm member is detachably installed to the base member.

4. The wiper apparatus according to claim 2, wherein:

the base member has a fixation shaft, which extends in a direction that is generally parallel to the pivot axis of the pivot shaft; and the arm member is installed to the fixation shaft in such a manner that a position of the arm member is adjustable about the fixation shaft.

5. The wiper apparatus according to claim 1, wherein the urging force of the at least one urging member is exerted on opposed lateral sides of the wiper arm or on a widthwise center part of the wiper arm.

6. The wiper apparatus according to claim 5, wherein the at least one urging member includes a first side urging member and a second side urging member, which are placed on opposed lateral sides, respectively, of the wiper arm.

7. The wiper apparatus according to claim 1, further comprising at least one conducting member that is interposed between the at least one urging member and one of the wiper arm and the swing member to indirectly conduct the urging force of the at least one urging member to the one of the wiper arm and the swing member.

8. The wiper apparatus according to claim 7, wherein the at least one conducting member includes a first side conducting member and a second side conducting member, which are placed on opposed lateral sides, respectively, of the wiper arm.

9. The wiper apparatus according to claim 8, wherein the at least one urging member includes a single urging member.

10. The wiper apparatus according to claim 7, wherein the at least one conducting member is connected to a widthwise center part of the wiper arm.

11. The wiper apparatus according to claim 1, wherein:

the swing member is generally planar;

a plane of the swing member is generally perpendicular to the pivot axis of the pivot shaft; and the at least one urging member extends in a direction generally parallel to the plane of the swing member.

12. The wiper apparatus according to claim 1, wherein when the wiper arm is pivoted about the pivot axis thereof toward or away from the wiping surface, the urging force of the at least one urging member changes between the urging force, which urges the wiper arm toward the wiping surface, and an urging force, which urges the wiper arm away from the wiping surface.

13. The wiper apparatus according to claim 1, wherein the wiper arm includes:

a base member that is directly connected to the distal end portion of the pivot shaft to pivot integrally with the pivot shaft about the pivot axis of the pivot shaft; and an elongated arm member that is installed to the base member.

14. The wiper apparatus according to claim 13, wherein:

a base end portion of the base member is directly connected to the distal end portion of the pivot shaft in a manner that enables pivoting of the base member toward or away from the wiping surface;

one side of the at least one urging member is directly or indirectly connected to the base member while an opposite side of the at least one urging member, which is opposite from the one side of the at least one urging member, is directly or indirectly connected to the swing member; and the at least one urging member exerts the urging force to urge the base member toward the wiping surface in the wiping operational position of the wiper arm.

15. The wiper apparatus according to claim 13, wherein:

the base member includes a first base portion, which is integrally fixed to the distal end portion of the pivot shaft, and a second base portion, which is directly connected to the first base portion in a manner that enables pivoting of the second base portion toward or away from the wiping surface, and which is also directly connected to a base end portion of the arm member;

one side of the at least one urging member is directly or indirectly connected to the second base portion while an opposite side of the at least one urging member, which is opposite from the one side of the at least one urging member, is directly or indirectly connected to the swing member; and the at least one urging member exerts the urging force to urge the second base portion toward the wiping surface in the wiping operational position of the wiper arm.

16. The wiper apparatus according to claim 13, wherein:

the arm member is directly connected to a distal end portion of the base member in a manner that enables pivoting of the arm member relative to the base member toward or away from the wiping surface;

one side of the at least one urging member is directly or indirectly connected to the arm member while an opposite side of the at least one urging member, which is opposite from the one side of the at least one urging member, is directly or indirectly connected to the swing member; and the at least one urging member exerts the urging force to urge the arm member toward the wiping surface in the wiping operational position of the wiper arm.

17. The wiper apparatus according to claim 1, wherein the at least one urging member includes at least one coil spring.

18. A wiper apparatus for wiping a wiping surface of a vehicle, comprising:
- a pivot holder that is adapted to be installed to a body of the vehicle;
- a pivot shaft that is supported by the pivot holder and is pivotable about a pivot axis thereof;
- a swing member that is fixed to the pivot shaft to drive the pivot shaft about the pivot axis;
- a wiper arm that is directly connected to a distal end portion of the pivot shaft and is pivoted together with the pivot shaft about the pivot axis of the pivot shaft when the pivot shaft is driven by the swing member, wherein the wiper arm is pivotable about a pivot axis thereof, which is angled relative to the pivot axis of the pivot shaft, toward or away from the wiping surface; and
- at least one urging member that is directly or indirectly connected between the wiper arm and the swing member to exert an urging force to urge the wiper arm toward the wiping surface in a wiping operational position of the wiper arm for wiping the wiping surface, wherein:

the wiper arm includes:
- a base member that is directly connected to the distal end portion of the pivot shaft and is engaged with the at least one urging member; and
- an elongated arm member that is installed to the base member;

the base member has a fixation shaft, which extends in a direction that is generally parallel to the pivot axis of the pivot shaft; and the arm member is installed to the fixation shaft in such a manner that a position of the arm member is adjustable about the fixation shaft.

* * * * *